(12) United States Patent
Yao et al.

(10) Patent No.: US 11,940,809 B2
(45) Date of Patent: Mar. 26, 2024

(54) MOVEMENT CONTROL METHOD, ELECTRONIC DEVICE, AND COMPUTER STORAGE MEDIUM

(71) Applicant: Willand (Beijing) Technology Co., LTD., Beijing (CN)

(72) Inventors: Zhuo Yao, Beijing (CN); Degan Lin, Beijing (CN)

(73) Assignee: Willand (Beijing) Technology Co., LTD., Beijing (CN)

( * ) Notice: Subject to any disclaimer, the term of this patent is extended or adjusted under 35 U.S.C. 154(b) by 0 days.

(21) Appl. No.: 18/335,519

(22) Filed: Jun. 15, 2023

(65) Prior Publication Data

US 2023/0409043 A1 Dec. 21, 2023

(30) Foreign Application Priority Data

Jun. 17, 2022 (CN) .......................... 202210694971.5

(51) Int. Cl.
*G05D 1/02* (2020.01)
*A01D 34/00* (2006.01)
(Continued)

(52) U.S. Cl.
CPC ......... *G05D 1/0274* (2013.01); *A01D 34/008* (2013.01); *G05D 1/0214* (2013.01);
(Continued)

(58) Field of Classification Search
None
See application file for complete search history.

(56) References Cited

U.S. PATENT DOCUMENTS 9,542,774 B2 * 1/2017 Marshall ................. G06T 17/20
11,579,618 B2 * 2/2023 Alban .................. A01D 34/008
(Continued)

FOREIGN PATENT DOCUMENTS

CN 108427409 A 8/2018
CN 111090277 A 5/2020
(Continued)

OTHER PUBLICATIONS

Tijs Leenknegt, "Three-dimensional path planning in complex environments" (Year: 2013).*
(Continued)

*Primary Examiner* — Adam D Tissot
*Assistant Examiner* — Garrett F Evans
(74) *Attorney, Agent, or Firm* — Emerson, Thomson & Bennett, LLC; Roger D. Emerson; Jarrett Wyatt

(57) ABSTRACT

A movement control method, an electronic device, and a computer storage medium are provided. The method includes: acquiring a first polygonal grid map corresponding to a target work region, determining an avoidance subregion non-traversable for the autonomous mobile mowing apparatus in the target work region according to three-dimensional information of each of polygonal planes in a first polygonal grid map and parameters of an autonomous mobile mowing apparatus; deleting a polygonal plane corresponding to the avoidance subregion from the first polygonal grid map to obtain a second polygonal grid map; and controlling the autonomous mobile mowing apparatus to move according to a second polygonal grid map. Based on the method, the region non-traversable for the autonomous mobile mowing apparatus can be avoided, thereby avoiding a danger caused by an abnormal handling behavior triggered by the autonomous mobile mowing apparatus, and improving safety of movement of the autonomous mobile mowing apparatus.

20 Claims, 8 Drawing Sheets

(51) Int. Cl.
A01D 101/00 (2006.01)
G05D 1/00 (2006.01)

(52) U.S. Cl.
CPC ....... G05D 1/0221 (2013.01); *A01D 2101/00* (2013.01); *G05D 2201/0208* (2013.01)

(56) References Cited

U.S. PATENT DOCUMENTS

| | | | |
|---|---|---|---|
| 2004/0158355 A1 | | 8/2004 | Hans et al. |
| 2010/0131251 A1* | | 5/2010 | Suzuki ................... G06F 30/18 |
| | | | 703/2 |
| 2010/0305854 A1 | | 12/2010 | Kammel et al. |
| 2016/0100522 A1 | | 4/2016 | Yamauchi et al. |
| 2017/0199525 A1 | | 7/2017 | Albaghajati et al. |
| 2019/0377346 A1* | | 12/2019 | Freitas ................... B62D 55/06 |
| 2021/0192841 A1 | | 6/2021 | Hu et al. |
| 2021/0232146 A1 | | 7/2021 | Muro et al. |
| 2022/0111868 A1 | | 4/2022 | Costea et al. |

FOREIGN PATENT DOCUMENTS

| | | |
|---|---|---|
| CN | 111912418 A | 11/2020 |
| CN | 112017134 A | 12/2020 |
| CN | 112578777 A | 3/2021 |
| CN | 112710318 A | 4/2021 |
| CN | 113115621 A | 7/2021 |
| CN | 113273375 A | 8/2021 |
| CN | 113341998 A | 9/2021 |
| CN | 113848892 A | 12/2021 |
| CN | 114610035 A | 6/2022 |
| EP | 3494769 A1 | 6/2019 |
| EP | 3695694 A1 | 8/2020 |
| EP | 3798574 A1 | 3/2021 |
| JP | 201 1065202 A | 3/2011 |
| JP | 2011065202 A | 3/2011 |
| JP | 2016187979 A | 11/2016 |
| JP | 2020190769 A | 11/2020 |

OTHER PUBLICATIONS

Lei Cao et al., "3D Space Representation Using Navigation Meshes", Journal of System Simulation, vol. 20 Suppl, Sep. 23, 2008.
Lei Cao et al., "3D Space Representation Using Navigation Meshes", Journal of System Simulation, vol. 20 Suppl, Sep. 23, 2008, China.
Zhaoying Li et al., "A new path planning method based on concave polygon convex decomposition and artificial bee colony algorithm", International Journal of Advanced Robotic Systems, Nov.-Dec. 2019: pp. 1-15.
Kuo Chun Huang et al., "A novel solution with rapid Voronoi based coverage path planning in irregular environment for robotic mowing systems", International Journal of Intelligent Robotics and Applications (2021) 5:558-575, Published online: Aug. 31, 2021.

* cited by examiner

MOVEMENT CONTROL METHOD, ELECTRONIC DEVICE, AND COMPUTER STORAGE MEDIUM

CROSS REFERENCE TO RELATED APPLICATIONS

The present disclosure claims priority to Chinese Application No. 202210694971.5 filed on Jun. 17, 2022, and entitled "MOVEMENT CONTROL METHOD, MOVEMENT CONTROL APPARATUS, ELECTRONIC DEVICE, AND COMPUTER STORAGE MEDIUM", all of which are incorporated herein by reference in their entirety.

TECHNICAL FIELD

Embodiments of the present disclosure relate to the technical field of artificial intelligence, and in particular to, a movement control method, an electronic device, and a computer storage medium.

BACKGROUND

As a fully automatic mechanical tool for trimming grass and vegetation, an autonomous mobile mowing apparatus is widely used in scenarios, such as landscaping, pruning, household, and public grass trimming. A smart autonomous mobile mowing apparatus can autonomously complete trimming a lawn without direct manual control and operation, thus reducing time occupancy of labor. When the smart autonomous mobile mowing apparatus is in service, movement control of the autonomous mobile mowing apparatus is required. The movement control of the autonomous mobile mowing apparatus is performed in combination with transfer path planning and coverage path planning.

Current transfer path planning and coverage path planning methods are transfer path planning methods and coverage path planning methods based on a two-dimensional plane.

However, an autonomous mobile operating apparatus, such as a mowing robot, is required to work on a non-planar surface. Three-dimensional information of an environment is not considered in existing path planning methods. When encountering a special environment or obstacle, the mowing robot triggers a behavior such as abnormal handling (e.g., lifting, obstacle bypassing, or being trapped), which will lead to a danger, thereby there is much room for improvement in safety of movement of the mowing robot.

SUMMARY

In view of the above problems, embodiments of the present disclosure are presented to provide a movement control method, an electronic device, and a computer storage medium, to at least solve the problem that safety of existing movement control remains to be improved.

One or more embodiments of the present disclosure provide a movement control method, including: acquiring a first polygonal grid map corresponding to a target work region, where the first polygonal grid map includes a three-dimensional continuous surface formed by splicing a plurality of polygonal planes, and different polygonal planes represent different subregions in the target work region; determining, according to three-dimensional information of each of the polygonal planes in the first polygonal grid map and parameters of an autonomous mobile mowing apparatus, an avoidance subregion non-traversable for the autonomous mobile mowing apparatus in the target work region; deleting a polygonal plane corresponding to the avoidance subregion from the first polygonal grid map to obtain a second polygonal grid map; and controlling the autonomous mobile mowing apparatus to move in the target work region according to the second polygonal grid map.

According to another aspect of the present disclosure, an electronic device is provided, including: a processor, a communication interface, a memory, and a communication bus, where the processor, the memory, and the communication interface complete communication with each other through the communication bus. The memory is used for storing at least one executable instruction, where the executable instruction causes the processor to perform operations of: acquiring a first polygonal grid map corresponding to a target work region, where the first polygonal grid map includes a three-dimensional continuous surface formed by splicing a plurality of polygonal planes, and different polygonal planes represent different subregions in the target work region; determining, according to three-dimensional information of each of the polygonal planes in the first polygonal grid map and parameters of an autonomous mobile mowing apparatus, an avoidance subregion non-traversable for the autonomous mobile mowing apparatus in the target work region; deleting a polygonal plane corresponding to the avoidance subregion from the first polygonal grid map to obtain a second polygonal grid map; and controlling the autonomous mobile mowing apparatus to move in the target work region according to the second polygonal grid map.

According to another aspect of the present disclosure, a computer storage medium is provided, where a computer program is stored within the computer storage medium, and the program, when executed by a processor, implements operations of: acquiring a first polygonal grid map corresponding to a target work region, where the first polygonal grid map includes a three-dimensional continuous surface formed by splicing a plurality of polygonal planes, and different polygonal planes represent different subregions in the target work region; determining, according to three-dimensional information of each of the polygonal planes in the first polygonal grid map and parameters of an autonomous mobile mowing apparatus, an avoidance subregion non-traversable for the autonomous mobile mowing apparatus in the target work region; deleting a polygonal plane corresponding to the avoidance subregion from the first polygonal grid map to obtain a second polygonal grid map; and controlling the autonomous mobile mowing apparatus to move in the target work region according to the second polygonal grid map.

According to another aspect of the present disclosure, a computer program product is provided, where the computer program product includes a computer instruction, the computer instruction instructing a computing device to perform corresponding operations of the movement control method according to the first aspect of the present disclosure.

According to the above technical schemes, after the first polygonal grid map corresponding to the target work region of the autonomous mobile mowing apparatus is acquired, the avoidance subregion non-traversable for the autonomous mobile mowing apparatus is deleted from the first polygonal grid map according to the three-dimensional information of the polygonal plane in the first polygonal grid map and the parameters of the autonomous mobile mowing apparatus to obtain the second polygonal grid map, and then the autonomous mobile mowing apparatus is controlled to move according to the second polygonal grid map, thereby avoiding a region non-traversable for the autonomous mobile mowing apparatus, avoiding a danger caused by an abnormal handling behavior (e.g., lifting, obstacle bypassing, or being trapped) triggered by the autonomous mobile mowing apparatus, and improving safety of movement of the autonomous mobile mowing apparatus.

BRIEF DESCRIPTION OF THE DRAWINGS

To more clearly describe technical schemes of embodiments of the present disclosure or existing technologies, drawings to be used in the description of the embodiments or the existing technologies will be briefly introduced below. Apparently, the drawings described below are some embodiments of the present disclosure. For those of ordinary skills in the art, other drawings may also be obtained based on these drawings without making creative work.

FIG. 1I is a schematic diagram of other substeps of step S104 in Embodiment I of the present disclosure;

List of reference numerals in the figures:

Figure 1A:
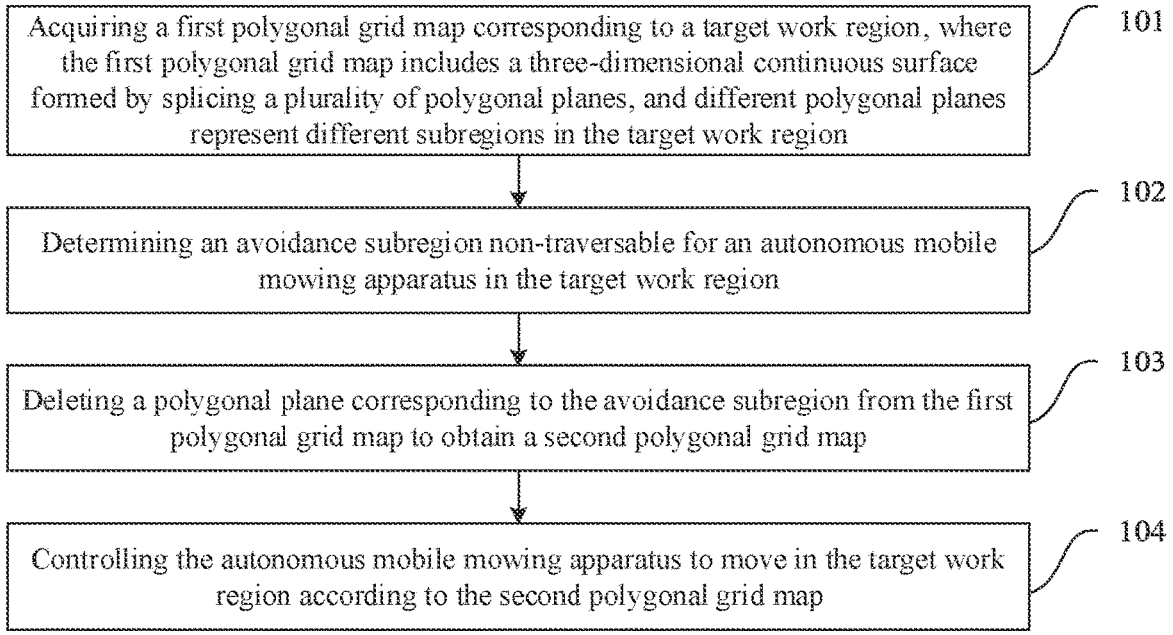
FIG. 1A is a schematic flowchart of steps of a movement control method provided in Embodiment I of the present disclosure.

10: autonomous mobile mowing apparatus
20: movement control apparatus
201: acquisition module
202: determination module
203: map processing module
204: movement control module
30: electronic device
31: processor
32: communication interface
33: memory
34: communication bus
35: program

DETAILED DESCRIPTION OF EMBODIMENTS

To enable those in the present technical field to better understand schemes of the present disclosure, technical schemes of embodiments of the present disclosure will be clearly and completely described below with reference to the drawings in the embodiments of the present disclosure. Apparently, the described embodiments are some embodiments, instead of all embodiments, of the present disclosure. All other embodiments obtained by those of ordinary skills in the art based on the embodiments of the present disclosure without making creative work are encompassed within the scope of protection of the present disclosure.

For convenience of description and understanding, before the description of the method, a structure and a working scenario of the autonomous mobile mowing apparatus are briefly described as follows.

In the present embodiment, the autonomous mobile mowing apparatus may be an automatic mower. The automatic mower may be configured to trim a lawn to guarantee that grass height in the lawn satisfies requirements. In order to realize automatic grass cutting, the automatic mower mainly includes a housing; and a driving wheel assembly, a mowing blade assembly, a controller, a communication module, a sensor, and the like provided on the housing.

The driving wheel assembly can drive the housing and components thereon to move. The mowing blade assembly is used for cutting grass. The controller is connected with electric signals of, e.g., the driving wheel assembly, the mowing blade assembly, the communication module, and the sensor, respectively, to control and position the automatic mower.

The communication module may be a module capable of implementing wireless communication, such as WIFI, Bluetooth, or cellular data network, and may be used to perform data communication between the automatic mower and an external device.

The sensor can detect data of the automatic mower, thereby positioning the automatic mower. For example, the sensor on the automatic mower may include, but is not limited to, a built-in IMU (inertial navigation unit), a GPS (global positioning system), a magnetometer, a barometer, etc.

Embodiment I

An implementation process of the movement control method is illustrated as follows:

According to the method in the present embodiment, a first polygonal grid map includes a three-dimensional continuous surface formed by splicing a plurality of polygonal planes, and different polygonal planes represent different subregions in a target work region. Three-dimensional information of the polygonal planes is compared with parameters of an autonomous mobile mowing apparatus, to determine a polygonal plane with three-dimensional information failing to satisfy parameter requirements of the autonomous mobile mowing apparatus as an avoidance subregion non-traversable for the autonomous mobile mowing apparatus. The avoidance subregion is deleted from the first polygonal grid map to obtain a second polygonal grid map without an avoidance subregion. The autonomous mobile mowing apparatus is controlled to move in the target work region according to the second polygonal grid map.

According to the above technical schemes, after the first polygonal grid map corresponding to the target work region of the autonomous mobile mowing apparatus is acquired, the avoidance subregion non-traversable for the autonomous mobile mowing apparatus is deleted from the first polygonal grid map according to the three-dimensional information of the polygonal plane in the first polygonal grid map and the parameters of the autonomous mobile mowing apparatus to obtain the second polygonal grid map, and then the autonomous mobile mowing apparatus is controlled to move according to the second polygonal grid map, thereby avoiding a region non-traversable for the autonomous mobile mowing apparatus, avoiding a danger caused by an abnormal handling behavior (e.g., lifting, obstacle bypassing, or being trapped) triggered by the autonomous mobile mowing apparatus, and improving safety of movement of the autonomous mobile mowing apparatus.

The method is illustrated below. As shown in FIG. 1A, a schematic flowchart of steps of the movement control method is shown. In the present embodiment, the method includes the following steps:

Step 101: acquiring a first polygonal grid map corresponding to a target work region.

The first polygonal grid map includes a three-dimensional continuous surface formed by splicing a plurality of polygonal planes, and different polygonal planes represent different subregions in the target work region.

The target work region image may be a voxel grid map or a polygonal grid map. When the target work region image is a voxel grid map, plane fitting on the voxel grid map is executed, where the plane fitting method may be, e.g., RANSAC (RANdom SAmple Consensus) or ICP (Iterative Closest Point). The voxel grid map is converted into the first polygonal grid map including the three-dimensional continuous surface spliced from the plurality of polygonal planes. When the target work region image is a polygonal grid map, because the polygonal grid map includes a three-dimensional continuous surface spliced from a plurality of polygonal planes, the target work region image is directly used as the first polygonal grid map.

Step 102: determining an avoidance subregion non-traversable for an autonomous mobile mowing apparatus in the target work region.

Parameters of the autonomous mobile mowing apparatus indicate environmental conditions for safe operation of the autonomous mobile mowing apparatus. According to three-dimensional information of each of the polygonal planes in the first polygonal grid map and the parameters of the autonomous mobile mowing apparatus, whether the autonomous mobile mowing apparatus can run safely on each subregion included in the target work region can be determined, and then a subregion where the autonomous mobile mowing apparatus cannot run safely is determined as the avoidance subregion non-traversable for the autonomous mobile mowing apparatus.

In a feasible implementation, the three-dimensional information includes a maximum pitch angle and a maximum roll angle, where the maximum pitch angle and the maximum roll angle define a maximum slope where the autonomous mobile mowing apparatus can move safely.

Figure 1B:
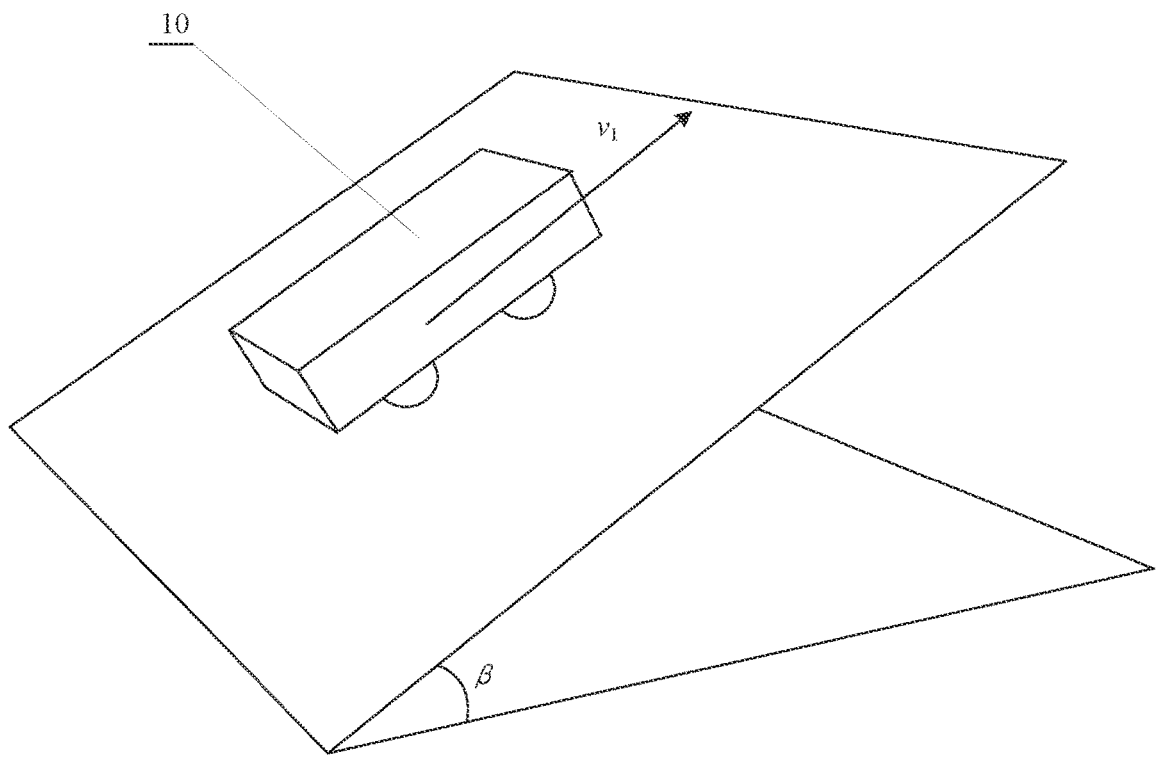
FIG. 1B is a schematic diagram of a maximum pitch angle in Embodiment I of the present disclosure.

FIG. 1B is a schematic diagram of a maximum pitch angle in an embodiment of the present disclosure. As shown in FIG. 1B, when an autonomous mobile mowing apparatus 10 moves along a slope direction $v_1$ of a slope, an angle $\alpha$ between the slope and a horizontal plane is a maximum pitch angle of the slope. The parameters of the autonomous mobile mowing apparatus 10 include a pitch angle threshold $\alpha_0$. When $\alpha$ is less than or equal to $\alpha_0$, the autonomous mobile mowing apparatus 10 can run safely on the slope, and when $\alpha$ is greater than $\alpha_0$, the autonomous mobile mowing apparatus 10 will have abnormal situations, such as slipping or being trapped.

Figure 1C:
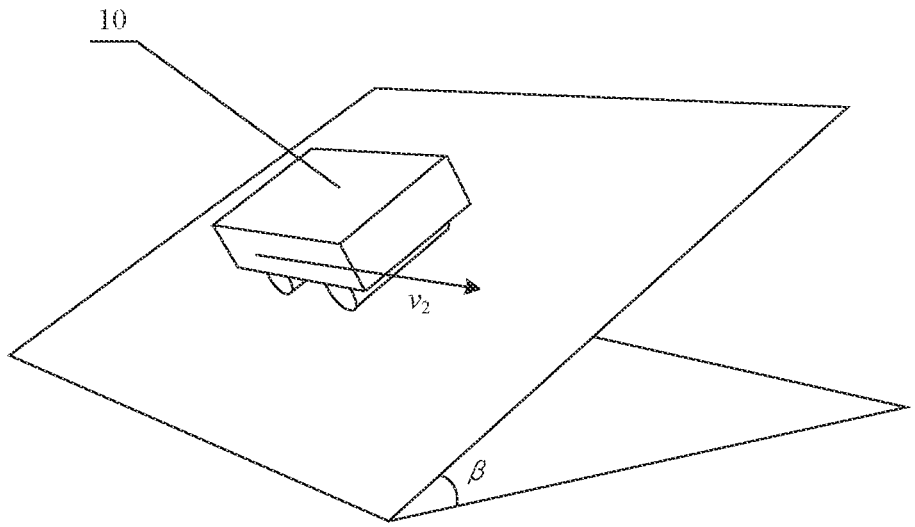
FIG. 1C is a schematic diagram of a maximum roll angle in Embodiment I of the present disclosure.

FIG. 1C is a schematic diagram of a maximum roll angle in an embodiment of the present disclosure. As shown in FIG. 1C, when the autonomous mobile mowing apparatus 10 moves along a direction $v_2$ perpendicular to the slope direction $v_1$ of the slope, an angle $\beta$ between the slope and the horizontal plane is a maximum roll angle of the slope. The parameters of the autonomous mobile mowing apparatus 10 include a roll angle threshold $\beta_0$. When $\beta$ is less than or equal to $\beta_0$, the autonomous mobile mowing apparatus 10 can run safely on the slope, and when $\beta$ is greater than $\beta_0$, the autonomous mobile mowing apparatus 10 will have abnormal situations, such as rollover.

Figure 1D:
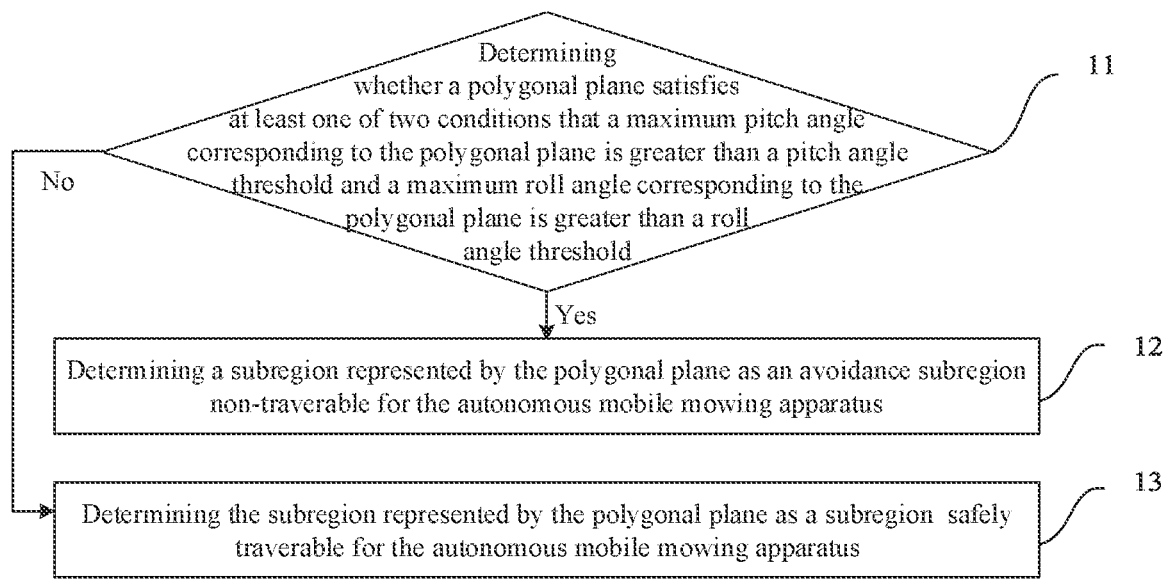
FIG. 1D is a schematic diagram of substeps of step S102 in Embodiment I of the present disclosure.

As shown in FIG. 1D, step 102 may be implemented through the following substeps:

Substep 11: determining whether a polygonal plane satisfies at least one of two conditions that a maximum pitch angle corresponding to the polygonal plane is greater than a pitch angle threshold and a maximum roll angle corresponding to the polygonal plane is greater than a roll angle threshold; performing substep 12 when the polygonal plane satisfies at least one of the two conditions that the maximum pitch angle corresponding to the polygonal plane is greater than the pitch angle threshold and the maximum roll angle corresponding to the polygonal plane is greater than the roll angle threshold; and performing substep 13 when the polygonal plane fails to satisfy at least one of the two conditions that the maximum pitch angle corresponding to the polygonal plane is greater than the pitch angle threshold and the maximum roll angle corresponding to the polygonal plan is greater than the roll angle threshold.

Substep 12: determining a subregion represented by the polygonal plane as an avoidance subregion non-traversable for the autonomous mobile mowing apparatus, and completing a current process.

Substep 13: determining the subregion represented by the polygonal plane as a subregion safely traversable for the autonomous mobile mowing apparatus.

When the maximum pitch angle $\alpha$ of the polygonal plane is greater than the pitch angle threshold $\alpha_0$, the autonomous mobile mowing apparatus 10 cannot run safely on the slope. Therefore, the polygonal plane is determined as the avoidance subregion non-traversable for the autonomous mobile mowing apparatus. When the maximum roll angle $\beta$ of the polygonal plane is greater than the roll angle threshold $\beta_0$, the autonomous mobile mowing apparatus 10 cannot run safely on the slope, either. Therefore, the polygonal plane is also determined as the avoidance subregion non-traversable for the autonomous mobile mowing apparatus.

A polygonal plane with a maximum pitch angle greater than the pitch angle threshold of the autonomous mobile mowing apparatus is determined as an avoidance subregion non-traversable for the autonomous mobile mowing apparatus. The autonomous mobile mowing apparatus is made to avoid the avoidance subregion, thereby guaranteeing that the autonomous mobile mowing apparatus runs safely along the $v_1$ direction within the subregion represented by the polygonal plane. A polygonal plane with a maximum roll angle greater than the roll angle threshold of the autonomous mobile mowing apparatus is determined as an avoidance subregion non-traversable for the autonomous mobile mowing apparatus. The autonomous mobile mowing apparatus is made to avoid the avoidance subregion, thereby guaranteeing that the autonomous mobile mowing apparatus runs safely along the $v_2$ direction within the subregion represented by the polygonal plane.

Step 103: deleting a polygonal plane corresponding to the avoidance subregion from the first polygonal grid map to obtain a second polygonal grid map.

Figure 1E:
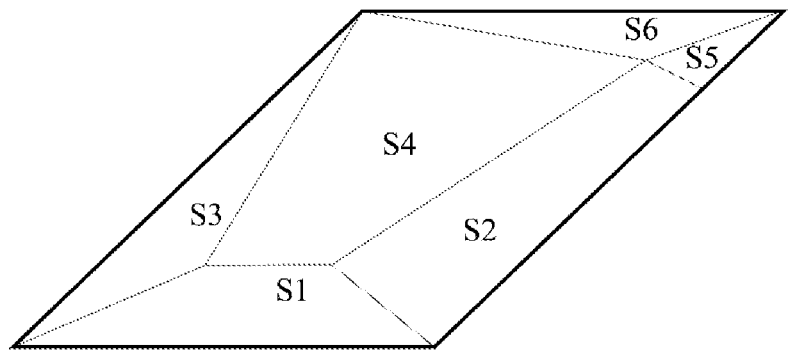
FIG. 1E is a schematic diagram of a second polygonal grid map in Embodiment I of the present disclosure.

FIG. 1E shows a possible second polygonal grid map including six polygonal planes S1 to S6.

Because the autonomous mobile mowing apparatus needs to avoid the avoidance subregion during moving, the polygonal plane corresponding to the avoidance subregion is deleted from the first polygonal grid map to obtain the second polygonal grid map including subregions corresponding to all polygonal planes safely traversable for the autonomous mobile mowing apparatus.

Step 104: controlling the autonomous mobile mowing apparatus to move in the target work region according to the second polygonal grid map.

Figure 1F:
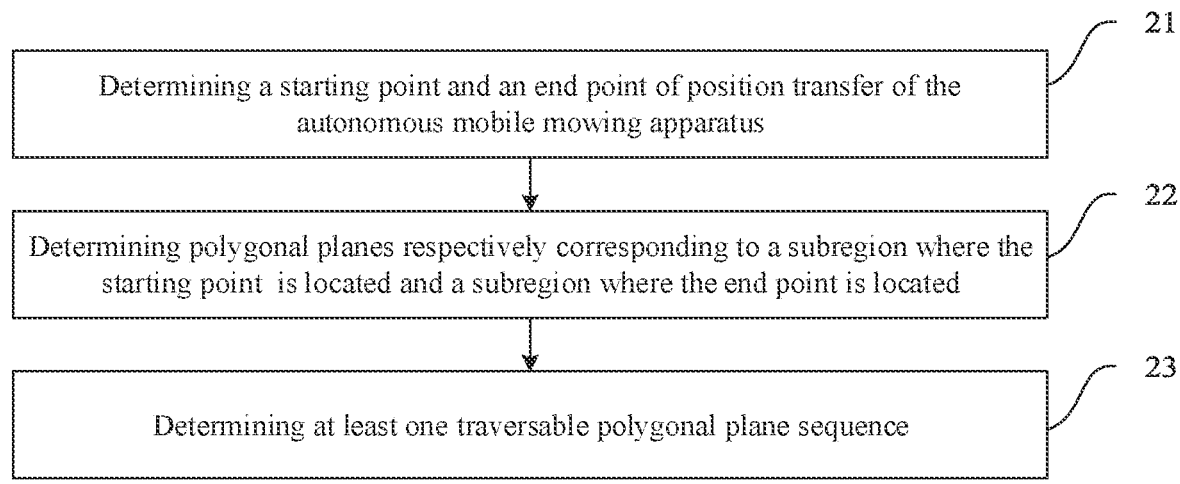
FIG. 1F is a schematic diagram of substeps of step S104 in Embodiment I of the present disclosure.

In a feasible implementation, according to the second polygonal grid map, the autonomous mobile mowing apparatus is controlled to perform transfer movement between subregions corresponding to polygonal planes in the second polygonal grid map. As shown in FIG. 1F, step S104 includes the following substeps:

Substep 21: determining a starting point and an end point of position transfer of the autonomous mobile mowing apparatus.

The starting point of the position transfer of the autonomous mobile mowing apparatus within the second polygonal grid map and the final end point of the position transfer of the autonomous mobile mowing apparatus within the second polygonal grid map are determined. The starting point and the end point of the position transfer of the autonomous mobile mowing apparatus within the second polygonal grid map are used for transfer path planning of the autonomous mobile mowing apparatus.

Substep 22: determining polygonal planes respectively corresponding to a subregion where the starting point is located and a subregion where the end point is located.

FIG. 1E is a schematic diagram of a second polygonal grid map in Embodiment I of the present disclosure. As shown in FIG. 1E, the polygonal plane corresponding to the subregion where the starting point is located is S1, and the polygonal plane corresponding to the subregion where the end point is located is S6.

The polygonal planes respectively corresponding to the subregions where the starting point and the end point of the position transfer of the autonomous mobile mowing apparatus are respective located are used to determine a traversable polygonal plane sequence of the autonomous mobile mowing apparatus during transfer movement between subregions.

Substep 23: determining at least one traversable polygonal plane sequence.

The traversable polygonal plane sequence includes at least two successively adjacent polygonal planes, a first polygonal plane in the traversable polygonal plane sequence is the polygonal plane corresponding to the subregion where the starting point is located, and a last polygonal plane in the traversable polygonal plane sequence is the polygonal plane corresponding to the subregion where the end point is located.

According to the example in substep 22, the traversable polygonal plane sequence includes a plurality of sequences, such as S1-S4-S6, S1-S3-S4-S6, S1-S2-S4-S6, or S1-S2-S5-S6.

In order to determine the order of subregions corresponding to polygonal planes through which the autonomous mobile mowing apparatus passes during transferring from the starting point to the end point, it is necessary to establish a traversable polygonal plane sequence, where the traversable polygonal plane sequence includes at least two polygonal planes, so that at least one traversable polygonal plane sequence can be determined according to the polygonal planes respectively corresponding to the subregions where the start point and the end point are respectively located and an adjacency relationship between the polygonal planes in the second polygonal grid map.

In an example, step 23 may be implemented through the following processes:

Process 231: establishing an undirected graph corresponding to the second polygonal grid map.

Figure 1G:
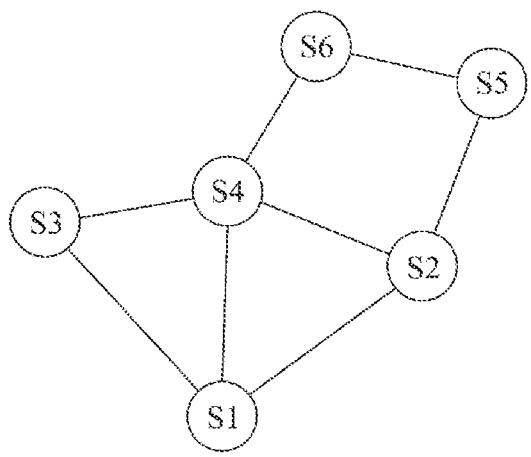
FIG. 1G is a schematic diagram of an undirected graph in Embodiment I of the present disclosure.

The undirected graph established corresponding to the second polygonal grid map in FIG. 1E is shown in FIG. 1G.

The undirected graph is established according to whether there is a direct connection relationship between the polygonal planes by taking the planes as vertexes and the connections between the planes as edges. The established undirected graph is used as the basis for subsequent transfer path search.

Process 232: determining at least one traversable polygonal plane sequence.

The first polygonal plane in the traversable polygonal plane sequence is the polygonal plane corresponding to the subregion where the starting point is located, and the last polygonal plane in the traversable polygonal plane sequence is the polygonal plane corresponding to the subregion where the end point is located. All polygonal planes corresponding to subregions through which the autonomous mobile mowing apparatus passes during transferring from the starting point to the end point are determined based on the undirected graph, and at least one traversable sequence is determined.

For example, as shown in FIG. 1G, the determined traversable polygonal plane sequence includes a plurality of sequences, such as S1-S4-S6, S1-S3-S4-S6, S1-S2-S4-S6, and S1-S2-S5-S6.

Substep 24: determining a first transfer path of the autonomous mobile mowing apparatus transferring from the starting point to the end point according to the traversable polygonal plane sequence.

In an example, step 24 may be implemented through the following processes:

Process 241: determining, for each traversable polygonal plane sequence among N traversable polygonal plane sequences, an i-th path segment of the autonomous mobile mowing apparatus on a subregion represented by an i-th polygonal plane. N is a positive integer greater than or equal to 2, i is a positive integer less than or equal to N−1, the 1st polygonal plane is the polygonal plane corresponding to the subregion where the starting point is located, a path starting point of a 1st path segment is the starting point, and a path starting point of an (i+1)-th path segment is a path end point of the i-th path segment.

According to the example in process 232, for the generated N traversable polygonal plane sequences, taking the sequence S1-S4-S6 as an example, the 1st path segment of the autonomous mobile mowing apparatus on the S1 is determined by searching for a path with a target of minimizing a movement path for the autonomous mobile mowing apparatus moving to a subregion corresponding to the polygonal plane S4, and a 2nd path segment of the autonomous mobile mowing apparatus on a subregion corresponding to the polygonal plane S4 is determined by search a path with a target of minimizing a movement path for the autonomous mobile mowing apparatus moving to the S6.

During path search, the autonomous mobile mowing apparatus needs to avoid obstacles on subregions represented by polygonal planes. Therefore, it is necessary to search a path with a target of minimizing a movement path for the autonomous mobile mowing apparatus moving to a subregion represented by an (i+1)-th polygonal plane according to obstacle distribution on the subregion represented by the i-th polygonal plane in the traversable polygonal plane sequence.

Process 242: determining an N-th path segment of the autonomous mobile mowing apparatus on a subregion represented by an N-th polygonal plane, where the N-th polygonal plane is the polygonal plane corresponding to the subregion where the end point is located.

According to the example in process 241, taking the sequence S1-S4-S6 as an example, a 3rd path segment of the autonomous mobile mowing apparatus on the S6 is determined.

During path search of the N-th path segment between the end point and a path end point of an (N−1)-th path segment on a subregion represented by an (N−1)-th polygonal plane, it is necessary to avoid an obstacle on the subregion represented by the N-th polygonal plane. Therefore, it is necessary to search a path with a target of minimizing a movement path for the autonomous mobile mowing apparatus moving to the end point according to obstacle distribution on the subregion represented by the N-th polygonal plane in the traversable polygonal plane sequence.

Process 243: obtaining the first transfer path of the autonomous mobile mowing apparatus transferring from the starting point to the end point.

According to the example in process 241, taking the sequence S1-S4-S6 as an example, the 1st path segment to the 3rd path segment determined in the above processes 241 and 242 are combined to obtain the first transfer path according to an order of combination of path segments of the 1st path segment-the 2nd path segment-the 3rd path segment determined based on the order of the traversable polygonal plane sequence S1-S4-S6. It should be noted that there is at least one first transfer path, and the number of first transfer paths corresponds to the number of traversable polygonal plane sequences.

According to an order of polygonal planes in the traversable polygonal plane sequence, an order of the 1st path segment to the N-th path segment in a subregion represented by a polygonal plane is determined, and the 1st path segment to the N-th path segment are combined according to the order of the path segments, to obtain the first transfer path of the autonomous mobile mowing apparatus transferring from the starting point to the end point.

Substep 25: obtaining a second transfer path with a shortest path length.

In order to improve a transfer efficiency of the autonomous mobile mowing apparatus, it is necessary to filter the first transfer path, to obtain a path with a shortest path length from the first transfer path, and use this path as the second transfer path.

Figure 1H:
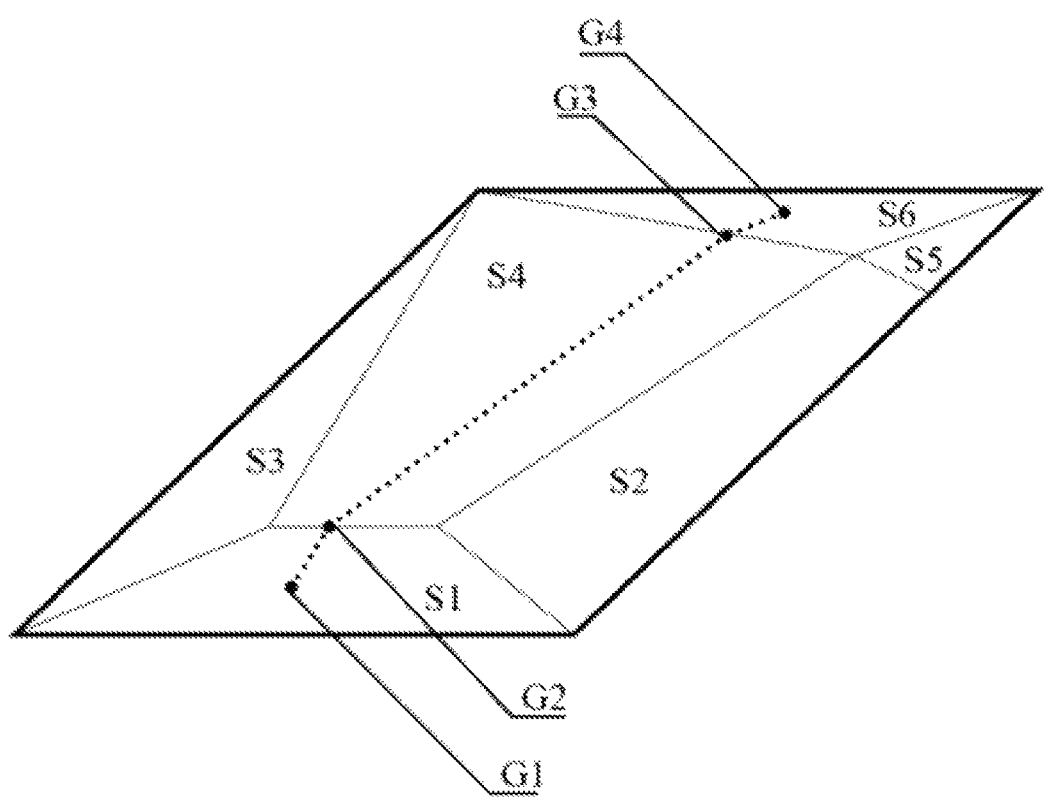
FIG. 1H is a schematic diagram of a second transfer path in Embodiment I of the present disclosure.
Figure 11:
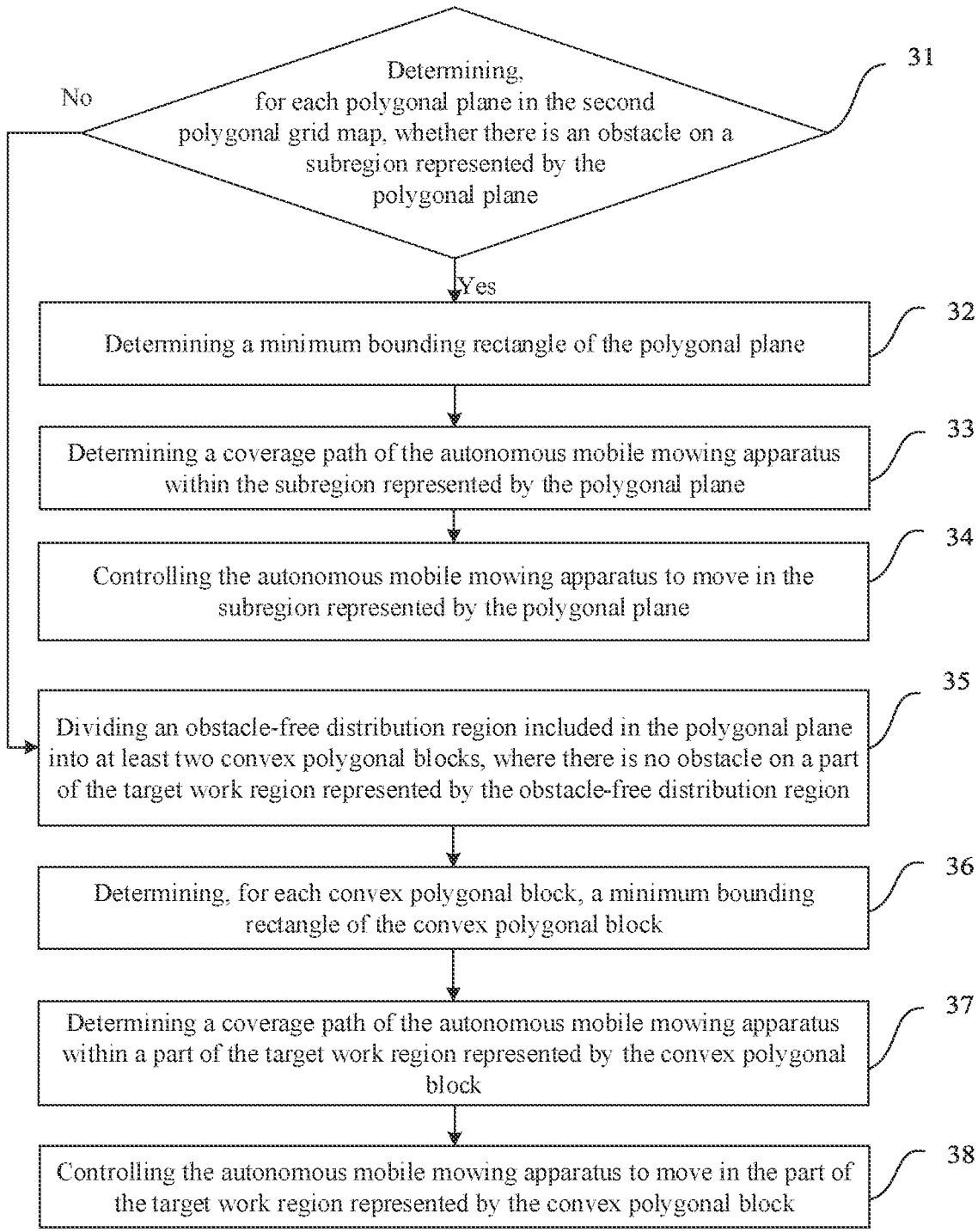

According to the example in substep 22, the path length is shortest when the traversable polygonal plane sequence is S1-S4-S6, and the second transfer path is as shown in FIG. 1H, where G1 is the starting point of the autonomous mobile mowing apparatus, G2 is an end point of the 1st path segment, G3 is an end point of the 2nd path segment, and G4 is the end point of the autonomous mobile mowing apparatus.

Substep 26: controlling the autonomous mobile mowing apparatus to move from the starting point to the end point according to the second transfer path.

According to a selected second transfer path, the second transfer path is used as a transfer path of the autonomous mobile mowing apparatus moving from the starting point to the end point, and the autonomous mobile mowing apparatus is controlled to start from the starting point and finally move to the end point in a subregion represented by a traversable surface according to the transfer path.

In a feasible implementation, according to the second polygonal grid map, the autonomous mobile mowing apparatus is controlled to perform transfer movement between the subregions corresponding to the polygonal planes in the second polygonal grid map. As shown in FIG. 1I, step 104 includes the following substeps:

Substep 31: determining, for each polygonal plane in the second polygonal grid map, whether there is an obstacle on a subregion represented by the polygonal plane; performing step 32 when there is no obstacle on the subregion represented by the polygonal plane; and performing step 35 when there is an obstacle on the subregion represented by the polygonal plane.

During coverage path planning of the autonomous mobile mowing apparatus, it is necessary to consider obstacle distribution on the subregion represented by each polygonal plane in the second polygonal grid map. If there is an obstacle, it is necessary to bypass the obstacle during the coverage path planning, and if there is no obstacle, a coverage path may be planned directly.

Substep 32: determining a minimum bounding rectangle of the polygonal plane.

Figure 1J:
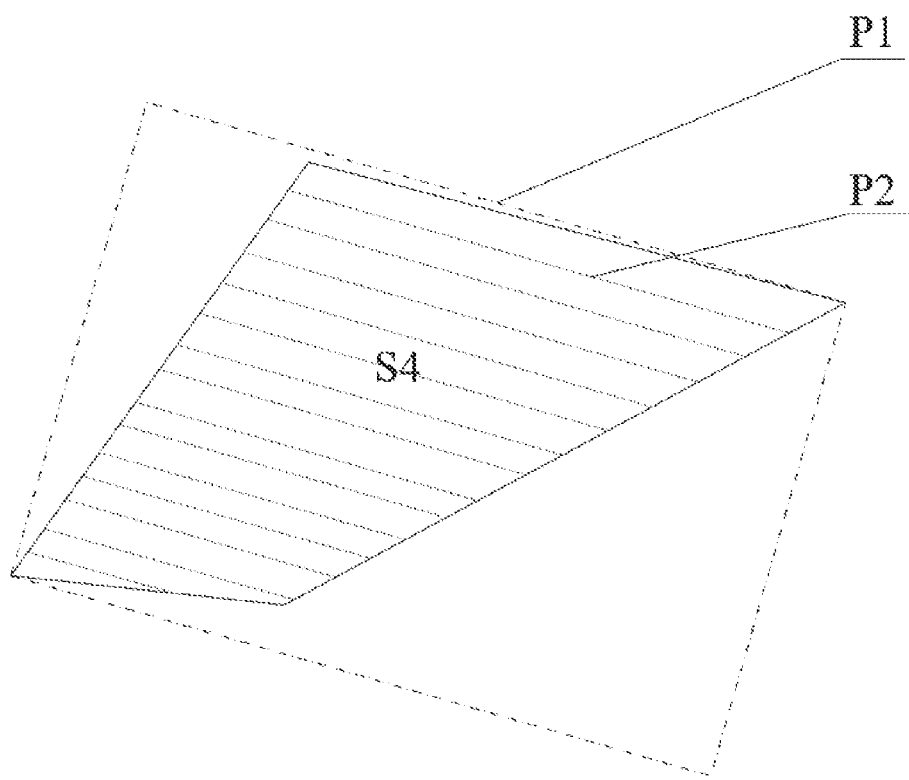
FIG. 1J is a schematic diagram of a minimum bounding rectangle of a polygonal plane in Embodiment I of the present disclosure.

As shown in FIG. 1J, taking the polygonal plane S4 as an example, when there is no obstacle on the polygonal plane S4, it is necessary to determine a longest side of a polygon corresponding to the polygonal plane S4, in order to minimize the number of direction transfers of the autonomous mobile mowing apparatus in the coverage path. Therefore, it is necessary to determine a minimum bounding rectangle of the polygon corresponding to the polygonal plane S4, and plan the coverage path based on a long side P1 of the minimum bounding rectangle of the polygon corresponding to the polygonal plane S4.

Substep 33: determining a coverage path of the autonomous mobile mowing apparatus within the subregion represented by the polygonal plane.

The coverage path of the autonomous mobile mowing apparatus within the subregion represented by the polygonal plane is determined with a long side direction of the minimum bounding rectangle of the polygonal plane as a mowing path direction of the autonomous mobile mowing apparatus.

As shown in FIG. 1J, taking the polygonal plane S4 in FIG. 1E as an example, a direction of the long side P1 of the minimum bounding rectangle of the polygonal plane S4 is the mowing path direction of the autonomous mobile mowing apparatus, equidistant parallel lines P2 are drawn within the polygonal plane S4, and all of the parallel lines P2 constitute the coverage path within the polygonal plane S4.

Substep 34: controlling the autonomous mobile mowing apparatus to move in the subregion represented by the polygonal plane, and completing a current process.

For any one polygonal plane, according to the coverage path for the polygonal plane determined in substep 33, the autonomous mobile mowing apparatus is controlled to move in the subregion represented by the polygonal plane according to the coverage path.

Substep 35: dividing an obstacle-free distribution region included in the polygonal plane into at least two convex polygonal blocks.

When there is an obstacle on the subregion represented by the polygonal plane, it is necessary to distinguish the obstacle-free distribution region, in order to avoid presence of an obstacle in the coverage path of the autonomous mobile mowing apparatus. Therefore, the obstacle-free distribution region included in the polygonal plane is divided into the at least two convex polygonal blocks. There is no obstacle on a part of the target work region represented by the obstacle-free distribution region.

Substep 36: determining, for each convex polygonal block, a minimum bounding rectangle of the convex polygonal block.

It is necessary to determine a longest side of the convex polygonal block, in order to minimize the number of direction transfers of the autonomous mobile mowing apparatus in the coverage path. Therefore, it is necessary to determine the minimum bounding rectangle of the convex polygonal block, and plan the coverage path based on a long side of the minimum bounding rectangle of the convex polygonal block. It should be noted that the method of determining the minimum bounding rectangle of the polygonal plane in the above substep 32 may be referred to for the method of determining the minimum bounding rectangle of the convex polygonal block in this substep, which will not be repeated here.

Substep 37: determining a coverage path of the autonomous mobile mowing apparatus within a part of the target work region represented by the convex polygonal block.

A coverage path of the autonomous mobile mowing apparatus within a subregion represented by the convex polygonal block is determined with the long side direction of the minimum bounding rectangle of the convex polygonal block as the mowing path direction of the autonomous mobile mowing apparatus. It should be noted that the method of determining the coverage path of the autonomous mobile mowing apparatus within the subregion represented by the polygonal plane in the above substep 33 may be referred to for the method of planning the coverage path based on the long side of the minimum bounding rectangle of the convex polygonal block in this substep, which will not be repeated here.

Substep 38: controlling the autonomous mobile mowing apparatus to move in the part of the target work region represented by the convex polygonal block.

According to a selected coverage path, the coverage path is used as the coverage path of the autonomous mobile mowing apparatus moving in the part of the target work region represented by the convex polygonal block, and the autonomous mobile mowing apparatus is controlled to move in the part of the target work region represented by the convex polygonal block according to the coverage path.

Figure 1K:
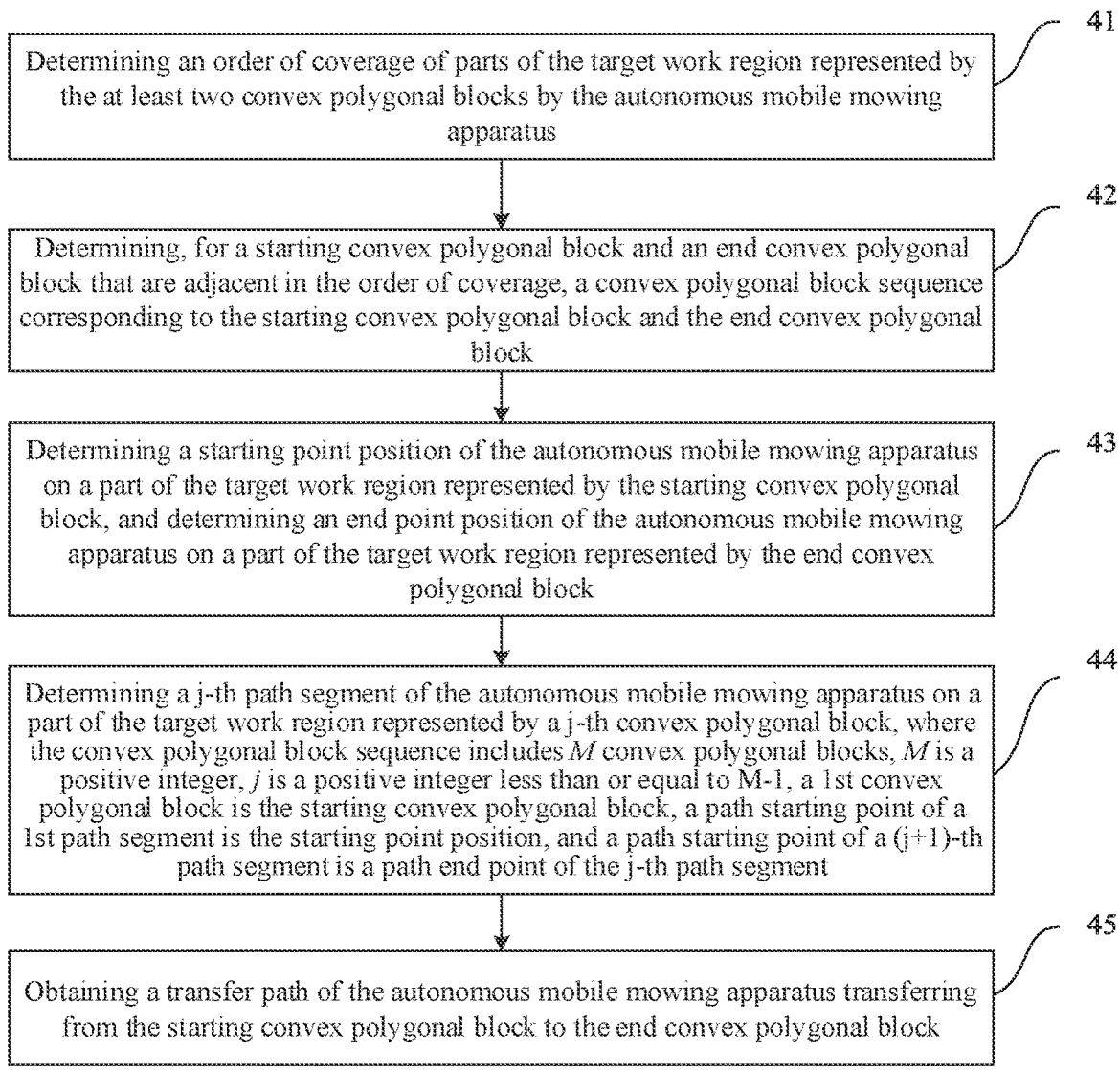
FIG. 1K is a schematic diagram of other substeps of step S104 in Embodiment I of the present disclosure.

In a feasible implementation, as shown in FIG. 1K, step 104 further includes the following substeps:

Substep 41: determining an order of coverage for parts of target region represented by the at least two convex polygonal blocks by the autonomous mobile mowing apparatus.

When the autonomous mobile mowing apparatus moves within the parts of the target region represented by the at least two convex polygonal blocks, it is necessary to determine the order of coverage for the parts of the target region represented by the at least two convex polygonal blocks by the autonomous mobile mowing apparatus, in order to determine an order of the parts of the target region represented by the convex polygonal blocks through which the autonomous mobile mowing apparatus passes during transferring from the starting point to the end point. The order of coverage is used for transfer path planning when the autonomous mobile mowing apparatus moves within the part of the target region represented by the at least two convex polygonal blocks.

Substep 42: determining, for a starting convex polygonal block and an end convex polygonal block that are adjacent in the order of coverage, a convex polygonal block sequence corresponding to the starting convex polygonal block and the end convex polygonal block.

For a polygonal plane, an order of coverage corresponding to the polygonal plane includes at least two convex polygonal blocks, and when performing a covering mowing operation on a subregion represented by the polygonal plane, the autonomous mobile mowing apparatus needs to successively perform the mowing operation on the parts of the target region represented by convex polygonal blocks included in the polygonal plane according to the order of coverage. After the autonomous mobile mowing apparatus completes the mowing operation on the part of the target region represented by a convex polygonal block, the autonomous mobile mowing apparatus needs to transfer to a part of the target region represented by the next convex polygonal block for the mowing operation according to the order of coverage.

For the starting convex polygonal block and the end convex polygonal block that are adjacent in the order of coverage, it is necessary to determine a path of the autonomous mobile mowing apparatus transferring from the part of the target region represented by the starting convex polygonal block to the part of the target region represented by the end convex polygonal block, so that the autonomous mobile mowing apparatus can transfer from the part of the target region represented by the starting convex polygonal block to the part of the target region represented by the end convex polygonal block according to this path. If the starting convex polygonal block is adjacent to the end convex polygonal block, the autonomous mobile mowing apparatus only needs to move from the part of the target region represented by the starting convex polygonal block to the part of the target region represented by the end convex polygonal block. In this case, the convex polygonal block sequence corresponding to the starting convex polygonal block and the end convex polygonal block is a combination of the starting convex polygonal block and the end convex polygonal block. If the starting convex polygonal block is not adjacent to the end convex polygonal block, the autonomous mobile mowing apparatus can move from the part of the target region represented by the starting convex polygonal block to the part of the target region represented by the end convex polygonal block through at least one path. Parts of the target region represented by convex polygonal blocks through which different paths pass are not completely same, a path with a shortest length may be selected from all paths, and then a combination of convex polygonal blocks corresponding to this path is determined as the convex polygonal block sequence corresponding to the starting convex polygonal block and the end convex polygonal block.

Substep 43: determining a starting point position of the autonomous mobile mowing apparatus on a part of the target work region represented by the starting convex polygonal block, and determining an end point position of the autonomous mobile mowing apparatus on a part of the target work region represented by the end convex polygonal block.

When the autonomous mobile mowing apparatus moves within the part of the target work region represented by the convex polygonal block, it is necessary to determine a portion of the starting point of the autonomous mobile mowing apparatus. During the transfer path planning, a starting point of the transfer path is the starting point of the autonomous mobile mowing apparatus. At the same time, it is necessary to determine a position of a target end point of the autonomous mobile mowing apparatus. During the transfer path planning, an end point of the transfer path is the target end point of the autonomous mobile mowing apparatus.

Substep 44: determining a j-th path segment of the autonomous mobile mowing apparatus on a part of the target work region represented by a j-th convex polygonal block. The convex polygonal block sequence includes M convex polygonal blocks, M is a positive integer, j is a positive integer less than or equal to M−1, a 1st convex polygonal block is the starting convex polygonal block, a path starting point of the 1st path segment is the starting point position, and a path starting point of a (j+1)-th path segment is a path end point of the j-th path segment.

During path search, the autonomous mobile mowing apparatus needs to avoid obstacles on parts of the target work region represented by convex polygonal blocks. Therefore, it is necessary to search for a path with a target of minimizing a movement path for the autonomous mobile mowing apparatus moving to a part of the target work region represented by a (j+1)-th convex polygonal block according to obstacle distribution on the parts of the target work region represented by the convex polygonal blocks.

Substep 45: obtaining a transfer path of the autonomous mobile mowing apparatus transferring from the starting convex polygonal block to the end convex polygonal block.

The 1st path segment to the M-th path segment are sequentially combined according to a traversal sequence of parts of the target work region represented by corresponding convex polygonal blocks thereof, to obtain a transfer path of the autonomous mobile mowing apparatus transferring from the starting convex polygonal block to the end convex polygonal block.

Figure 1L:
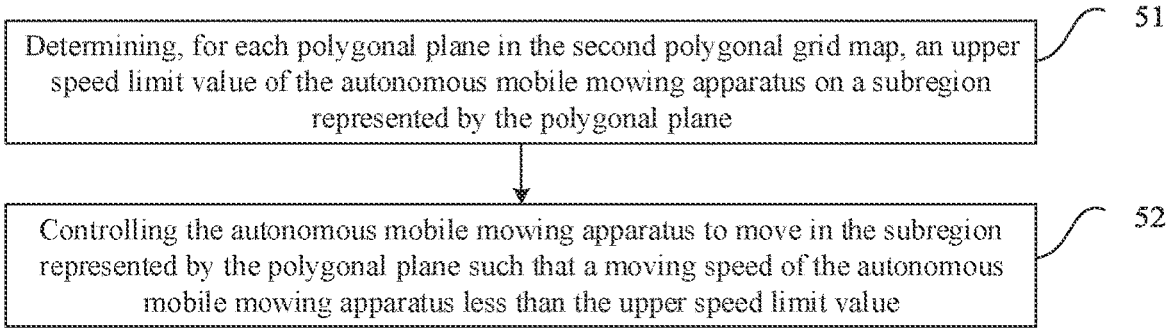
FIG. 1L is a schematic diagram of other substeps of step S104 in Embodiment I of the present disclosure.

In a feasible implementation, as shown in FIG. 1L, in any one of step 104 and its substeps, the controlling the autonomous mobile mowing apparatus to move in the target work region according to the second polygonal grid map further includes the following substeps:

Substep 51: determining, for each polygonal plane in the second polygonal grid map, an upper speed limit value of the autonomous mobile mowing apparatus on the subregion represented by the polygonal plane.

According to an angle of the polygonal plane with respect to a horizontal plane, a gradient of the polygonal plane is determined, and the upper speed limit value of the autonomous mobile mowing apparatus moving on the subregion represented by the polygonal plane is determined according to the gradient, where a magnitude of the gradient is inversely proportional to a magnitude of the upper speed limit value of the autonomous mobile mowing apparatus moving on the subregion represented by the polygonal plane.

Substep 52: controlling the autonomous mobile mowing apparatus to move in the subregion represented by the polygonal plane such that a moving speed of the autonomous mobile mowing apparatus is less than the upper speed limit value.

The moving speed of the autonomous mobile mowing apparatus within the subregion represented by the polygonal plane is controlled according to the upper speed limit value of the autonomous mobile mowing apparatus on the subregion represented by the polygonal plane such that the moving speed of the autonomous mobile mowing apparatus is less than the upper speed limit value.

Embodiment II

Figure 2:
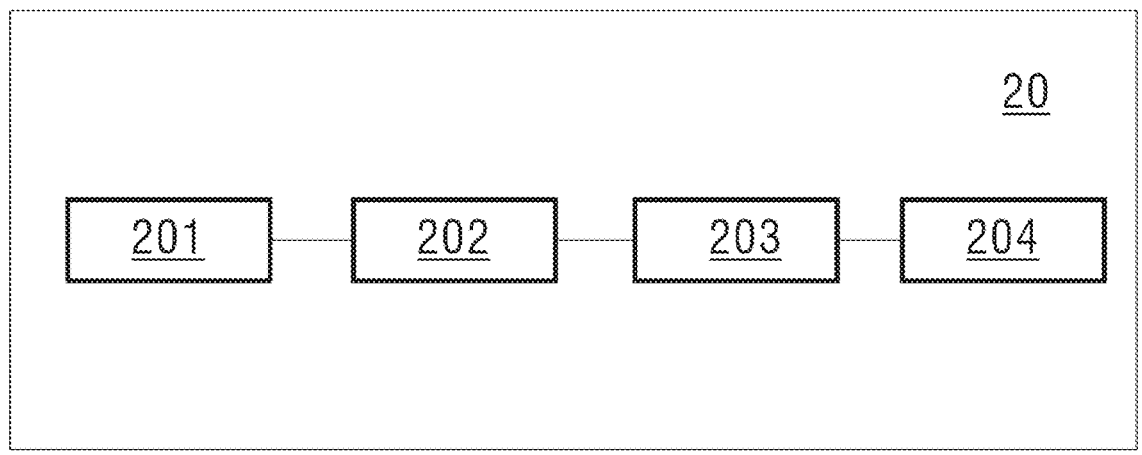
FIG. 2 is a structural block diagram of a movement control apparatus provided in Embodiment II of the present disclosure.

Referring to FIG. 2, a structural block diagram of an apparatus 20 for movement control provided in Embodiment II is shown. As shown in FIG. 2, the apparatus 20 for movement control includes:

an acquisition module 201 configured to acquire a first polygonal grid map corresponding to a target work region, where the first polygonal grid map includes a three-dimensional continuous surface formed by splicing a plurality of polygonal planes, and different polygonal planes represent different subregions in the target work region;

a determination module 202 configured to determine, according to three-dimensional information of each of the polygonal planes in the first polygonal grid map and parameters of an autonomous mobile mowing apparatus, an avoidance subregion non-traversable for the autonomous mobile mowing apparatus in the target work region;

a map processing module 203 configured to delete a polygonal plane corresponding to the avoidance subregion from the first polygonal grid map to obtain a second polygonal grid map; and a movement control module 204 configured to control the autonomous mobile mowing apparatus to move in the target work region according to the second polygonal grid map.

The above apparatus 20 for movement control acquires, by the acquisition module 201, the first polygonal grid map corresponding to the target work region of the autonomous mobile mowing apparatus, then determines, by the determination module 202, the avoidance subregion non-traversable for the autonomous mobile mowing apparatus in the target work region according to three-dimensional information of a polygonal plane in the first polygonal grid map and the parameters of the autonomous mobile mowing apparatus, deletes, by the map processing module 203, the avoidance subregion non-traversable for the autonomous mobile mowing apparatus from the first polygonal grid map to obtain the second polygonal grid map, and then controls, by the movement control module 204, the autonomous mobile mowing apparatus to move according to the second polygonal grid map, thereby avoiding a region non-traversable for the autonomous mobile mowing apparatus, avoiding a danger caused by an abnormal handling behavior (e.g., lifting, obstacle bypassing, or being trapped) triggered by the autonomous mobile mowing apparatus, and improving safety of movement of the autonomous mobile mowing apparatus.

In a feasible implementation, the three-dimensional information includes a maximum pitch angle and a maximum roll angle, and the parameters of the autonomous mobile mowing apparatus include a pitch angle threshold and a roll angle threshold. The determination module 202 can determine the avoidance subregion non-traversable for the autonomous mobile mowing apparatus within the target work region according to the three-dimensional information of each of the polygonal planes in the first polygonal grid map and the parameters of the autonomous mobile mowing apparatus, including: determining, for each of the polygonal planes in the first polygonal grid map, a subregion represented by the polygonal plane as the avoidance subregion non-traversable for the autonomous mobile mowing apparatus when the polygonal plane satisfies at least one of two conditions that the maximum pitch angle corresponding to the polygonal plane is greater than the pitch angle threshold, and the maximum roll angle corresponding to the polygonal plane is greater than the roll angle threshold.

In a feasible implementation, the movement control module 204 can determine a starting point and an end point of position transfer of the autonomous mobile mowing apparatus; determine polygonal planes respectively corresponding to subregions where the starting point is located and the end point is located; determine at least one traversable polygonal plane sequence according to the polygonal planes corresponding to the subregions where the starting point is located and the subregion where the end point is located and an adjacency relationship between polygonal planes in the second polygonal grid map, where the traversable polygonal plane sequence includes at least two successively adjacent polygonal planes, a first polygonal plane in the traversable polygonal plane sequence is the polygonal plane corresponding to the subregion where the starting point is located, and a last polygonal plane in the traversable polygonal plane sequence is the polygonal plane corresponding to the subregion where the end point is located; determine, for each of the traversable polygonal plane sequence, a first transfer path of the autonomous mobile mowing apparatus transferring from the starting point to the end point according to the traversable polygonal plane sequence; filter the first transfer path to obtain a second transfer path with a shortest path length; and control the autonomous mobile mowing apparatus to move from the starting point to the end point according to the second transfer path.

In a feasible implementation, the movement control module 204 can establish an undirected graph corresponding to the second polygonal grid map according to the adjacency relationship between the polygonal planes in the second polygonal grid map; and determine the at least one traversable polygonal plane sequence based on the polygonal plane where the starting point is located, the polygonal plane where the end point is located and the undirected graph.

In a feasible implementation, the movement control module 204 can search, for each of the traversable polygonal plane sequence, according to obstacle distribution on a subregion represented by an i-th polygonal plane in the traversable polygonal plane sequence, for a path with a target of minimizing a movement path for the autonomous mobile mowing apparatus mocing to a subregion represented by an (i+1)-th polygonal plane, to determine an i-th path segment of the autonomous mobile mowing apparatus on the subregion represented by the i-th polygonal plane, where the traversable polygonal plane sequence includes N polygonal planes, N is a positive integer greater than or equal to 2, i is a positive integer less than or equal to N−1, the 1st polygonal plane is the polygonal plane corresponding to the subregion where the starting point is located, a path starting point of a 1st path segment is the starting point, and a path starting point of an (i+1)-th path segment is a path end point of the i-th path segment; search, according to obstacle distribution on a subregion represented by an N-th polygonal plane in the traversable polygonal plane sequence, for a path with a target of minimizing a movement path for the autonomous mobile mowing apparatus moving to the end point, to determine an N-th path segment of the autonomous mobile mowing apparatus on the subregion represented by the N-th polygonal plane, where the N-th polygonal plane is a polygonal plane corresponding to the subregion where the end point is located; and sequentially combine the 1st path segment to the N-th path segment to obtain the first transfer path of the autonomous mobile mowing apparatus transferring from the starting point to the end point.

In a feasible implementation, the movement control module 204 can determine, for each polygonal plane in the second polygonal grid map, whether there is an obstacle on a subregion represented by the polygonal plane; and determine, when there is no obstacle on the subregion represented by the polygonal plane, a minimum bounding rectangle of the polygonal plane, determine a coverage path of the autonomous mobile mowing apparatus within the subregion represented by the polygonal plane with a long side direction of the minimum bounding rectangle as a mowing path direction of the autonomous mobile mowing apparatus, and control the autonomous mobile mowing apparatus to move in the subregion represented by the polygonal plane according to the coverage path. when there is an obstacle on the subregion represented by the polygonal plane, an obstacle-free distribution region included in the polygonal plane is divided into at least two convex polygonal blocks, where there is no obstacle on a part of the target work region represented by the obstacle-free distribution region; and for each of the convex polygonal blocks, a minimum bounding rectangle of the convex polygonal block is determined, a coverage path of the autonomous mobile mowing apparatus within a part of the target work region represented by the convex polygonal block is determined with the long side direction of the minimum bounding rectangle as the mowing path direction of the autonomous mobile mowing apparatus, and the autonomous mobile mowing apparatus is controlled to move in the part of the target work region represented by the convex polygonal block according to the coverage path.

In a feasible implementation, the movement control module 204 can determine an order of coverage parts of the target working region represented by the at least two convex polygonal blocks by the autonomous mobile mowing apparatus; determine, for a starting convex polygonal block and an end convex polygonal block that are adjacent in the order of coverage, a convex polygonal block sequence corresponding to the starting convex polygonal block and the end convex polygonal block according to an adjacency relationship between the at least two convex polygonal blocks; determine a starting point position of the autonomous mobile mowing apparatus on a part of the target work region represented by the starting convex polygonal block, and determine an end point position of the autonomous mobile mowing apparatus on a part of the target work region represented by the end convex polygonal block; search, according to obstacle distribution on the subregion represented by the polygonal plane, for a path with a target of minimizing a movement path for the autonomous mobile mowing apparatus moving to a part of the target work region represented by a (j+1)-th convex polygonal block, to determine a j-th path segment of the autonomous mobile mowing apparatus on a part of the target work region represented by a j-th convex polygonal block, where the convex polygonal block sequence includes M convex polygonal blocks, M is a positive integer, j is a positive integer less than or equal to M−1, a 1st convex polygonal block is the starting convex polygonal block, a path starting point of the 1st path segment is a position of the starting point, and a path starting point of a (j+1)-th path segment is a path end point of the j-th path segment; search, according to the obstacle distribution on the subregion represented by the polygonal plane, or a path with a target of minimizing a movement path for the autonomous mobile mowing apparatus moving to the end point position, to determine an M-th path segment of the autonomous mobile mowing apparatus on a part of the target work region represented by an M-th convex polygonal block, where the M-th convex polygonal block is a convex polygonal block corresponding to a part of the target work region where the end point position is located; and sequentially combine the 1st path segment to the M-th path segment to obtain a transfer path of the autonomous mobile mowing apparatus transferring from the starting convex polygonal block to the end convex polygonal block.

In a feasible implementation, the movement control module 204 can determine, for each of the polygonal planes in the second polygonal grid map, an upper speed limit value of the autonomous mobile mowing apparatus moving on a subregion represented by the polygonal plane according to an angle of the polygonal plane with respect to a horizontal plane, and control the autonomous mobile mowing apparatus to move in the subregion represented by the polygonal plane according to the upper speed limit value such that a moving speed of the autonomous mobile mowing apparatus is less than the upper speed limit value.

It should be noted that the interaction between the various modules in the above apparatus embodiments is based on the same inventive concept as the above method embodiments, and the description in the above method embodiments may be referred to for specific contents, which will not be repeated here.

Embodiment III

Figure 3:
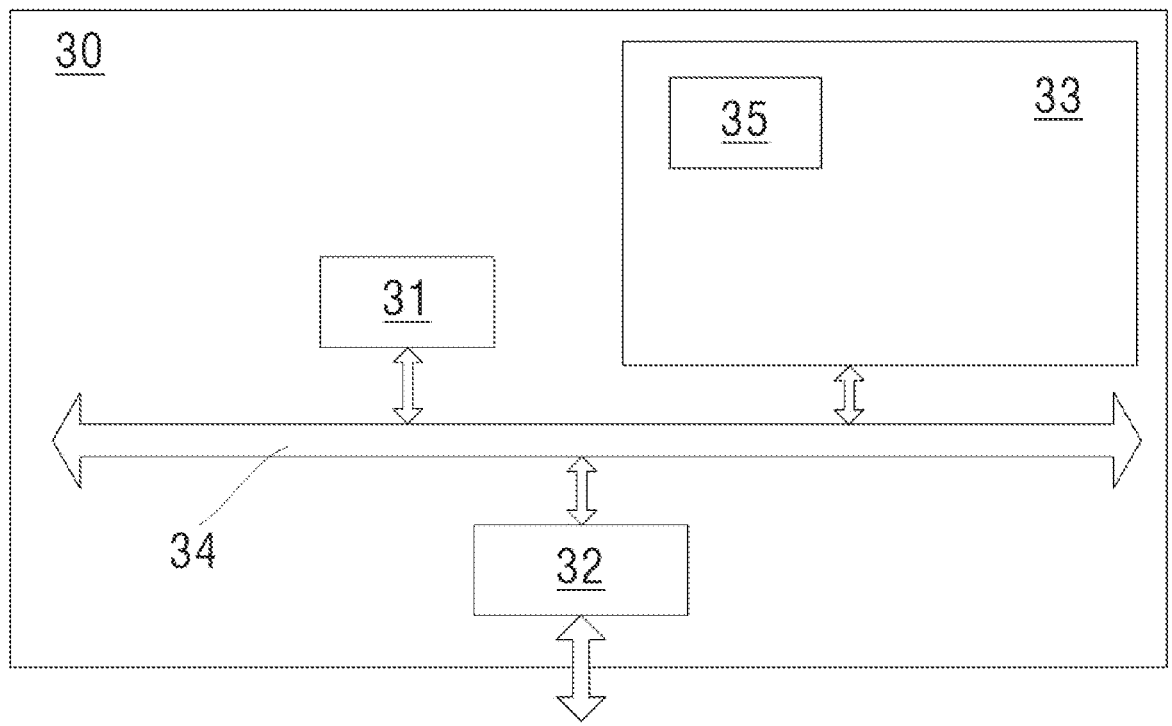
FIG. 3 is a structural block diagram of an electronic device provided in Embodiment III of the present disclosure.

The present embodiment provides an electronic device 30. As shown in FIG. 3, the electronic device 30 may include: a processor 31, a communication interface 32, a memory 33, and a communication bus 34, where:

the processor 31, the communication interface 32, and the memory 33 complete communication with each other through the communication bus 34, the communication interface 32 is configured to communicate with other electronic devices or servers; and the processor 31 is configured to perform a program 35, and specifically may perform relevant steps of the movement control method in the above embodiments.

Specifically, the program 35 may include a program code. The program code includes computer operation instructions.

The processor 31 may be a CPU, or an Application Specific Integrated Circuit (ASIC), or one or more integrated circuits configured to implement embodiments of the present disclosure. One or more processors included in a smart device may be processors of a same type, e.g., one or more CPUs; or may be processors of different types, e.g., one or more CPUs and one or more ASICs.

The memory 33 is configured to store the program 35. The memory 33 may include a high-speed RAM memory, and may further include a non-volatile memory, e.g., at least one disk memory.

The program 35 may specifically be used for causing the processor 31 to perform the movement control method in the above embodiments.

Corresponding description of the corresponding steps and units of the movement control method in the above embodiments may be referred to for specific implementations of the steps in the program 35, which will not be repeated here. Those skilled in the art can clearly understand that, for convenience and simplicity of description, the description of corresponding processes in the above method embodiments may be referred to for specific working processes of the above described device and modules, which will not be repeated here.

The electronic device in embodiments of the present disclosure deletes an avoidance subregion non-traversable for an autonomous mobile mowing apparatus from a first polygonal grid map according to three-dimensional information of a polygonal plane and parameters of the autonomous mobile mowing apparatus, so that the autonomous mobile mowing apparatus is controlled to move according to the second polygonal grid map, thereby avoiding an non-traversable special environment, avoiding a danger caused by a behavior, such as abnormal handling (e.g., lifting, obstacle bypassing, or being trapped), triggered by the autonomous mobile mowing apparatus, and improving safety of movement of the autonomous mobile mowing apparatus.

Embodiment IV

The present embodiment provides a computer-readable storage medium storing instructions for causing a machine to perform the movement control method as described herein. Specifically, a system or apparatus equipped with a storage medium may be provided, where the storage medium stores a software program code for implementing the functions of any one embodiment among the above embodiments, and makes a computer (or CPU or MPU) of the system or apparatus to read and perform the program code stored in the storage medium.

In this case, the program code read from the storage medium itself can implement the functions of any one embodiment among the above embodiments, and thus the program code and the storage medium storing the program code constitute a part of the present disclosure.

Examples of storage mediums for providing the program code include a floppy disk, a hard disk, a magneto-optical disk, an optical disk (e.g., CD-ROM, CD-R, CD-RW, DVD-ROM, DVD-RAM, DVD-RW, or DVD+RW), a magnetic tape, a non-volatile memory card, and a ROM. Alternatively, the program code may be downloaded from a server computer through a communication network.

Embodiment V

The present embodiment provides a computer program product, including a computer instruction, the computer instruction instructing a computing device to perform the corresponding operations of any one of the above method embodiments.

It should be noted that, depending on the implementation requirements, the components/steps described in the embodiments of the present disclosure may be split into more components/steps, or two or more components/steps or partial operations of the components/steps may be combined into novel components/steps to achieve the goal of the embodiments of the present disclosure.

The above method according to the embodiments of the present disclosure may be implemented in hardware or firmware, or be implemented as software or a computer code storable in a recording medium (such as a CD ROM, a RAM, a floppy disk, a hard disk, or a magneto-optical disk), or be implemented as a computer code that is downloaded from a network, is originally stored in a remote recording medium or a non-transitory machine-readable medium, and will be stored in a local recording medium, such that the method described herein may be processed by such software stored on a recording medium using a general-purpose computer, a special-purpose processor, or programmable or dedicated hardware (such as an ASIC or FPGA). It is understandable that a computer, a processor, a microprocessor controller, or programmable hardware includes a storage component (e.g., a RAM, a ROM, or a flash memory) that can store or receive software or a computer code. The method described herein is implemented when the software or the computer code is accessed and executed by the computer, the processor, or the hardware. Further, when a general purpose computer accesses the code for implementing the method shown herein, the execution of the code converts the general purpose computer to a special purpose computer configured to perform the method shown herein.

It should be noted that, in the description of the present disclosure, the terms "first" and "second" are only used for ease of description of different components or names, and cannot be understood as indicating or implying sequential relationship and relative importance or implicitly indicating the number of indicated technical features. Thus, features defined with "first" or "second" may explicitly or implicitly include at least one of the features.

Unless otherwise defined, all technical terms and scientific terms used herein have the same meaning as commonly understood by those skilled in the technical field of the present disclosure. The terms used herein in the description of the present disclosure are only for the purpose of describing specific embodiments, and are not intended to limit the present disclosure.

It should be noted that, the specific embodiments of the present disclosure are described in detail with reference to the drawings, but should not be understood as imposing any limitation on the scope of protection of the present disclosure. Within the scope described in the claims, various alterations and modifications that can be made by those skilled in the art without making creative work are still encompassed within the scope of protection of the present disclosure.

The examples of the embodiments of the present disclosure are intended to simply illustrate the technical features of the embodiments of the present disclosure, so that those skilled in the art can intuitively understand the technical features of the embodiments of the present disclosure, which are not used to impose any improper limitation on the embodiments of the present disclosure.

Finally, it should be noted that: the above embodiments are merely used to illustrate the technical schemes of the present disclosure, instead of imposing any limitation on the technical schemes. While the present disclosure is described in detail with reference to the above embodiments, those of ordinary skills in the art should understand that: the technical schemes disclosed in the above embodiments may still be modified or a part of the technical features thereof may be replaced equivalently. These modifications or replacements are not intended to make the essence of corresponding technical schemes depart from the spirit and scope of the technical schemes of the embodiments of the present disclosure.

The invention claimed is:

1. A movement control method, comprising:
acquiring a first polygonal grid map corresponding to a target work region, wherein the first polygonal grid map comprises a three-dimensional continuous surface formed by splicing a plurality of polygonal planes, and different polygonal planes represent different subregions in the target work region;
determining, according to three-dimensional information of each of the polygonal planes in the first polygonal grid map and parameters of an autonomous mobile mowing apparatus, an avoidance subregion non-traversable for the autonomous mobile mowing apparatus in the target work region;
deleting a polygonal plane corresponding to the avoidance subregion from the first polygonal grid map to obtain a second polygonal grid map; and
controlling the autonomous mobile mowing apparatus to move in the target work region according to the second polygonal grid map,
wherein the controlling the autonomous mobile mowing apparatus to move in the target work region according to the second polygonal grid map comprises:
determining a starting point and an end point of position transfer of the autonomous mobile mowing apparatus;
determining polygonal planes respectively corresponding to a subregion where the starting point is located and a subregion where the end point is located;
determining at least one traversable polygonal plane sequence according to the polygonal planes respectively corresponding to the subregion where the starting point is located and the subregion where the end point is located and an adjacency relationship between the polygonal planes in the second polygonal grid map, wherein the traversable polygonal plane sequence comprises at least two successively adjacent polygonal planes, a first polygonal plane in the traversable polygonal plane sequence is the polygonal plane corresponding to the subregion where the starting point is located, and a last polygonal plane in the traversable polygonal plane sequence is the polygonal plane corresponding to the subregion where the end point is located;
determining, for each of the traversable polygonal plane sequence, a first transfer path of the autonomous mobile mowing apparatus transferring from the starting point to the end point according to the traversable polygonal plane sequence;
filtering the first transfer path to obtain a second transfer path with a shortest path length; and
controlling the autonomous mobile mowing apparatus to move from the starting point to the end point according to the second transfer path; and
wherein the determining, for each of the traversable polygonal plane sequence, the first transfer path of the autonomous mobile mowing apparatus transferring from the starting point to the end point according to the traversable polygonal plane sequence comprises:
searching, for each of the traversable polygonal plane sequence, according to obstacle distribution on a subregion represented by an i-th polygonal plane in the traversable polygonal plane sequence, for a path with a target of minimizing a movement path for the autonomous mobile mowing apparatus moving to a subregion represented by an (i+1)th polygonal plane, to determine an i-th path segment of the autonomous mobile mowing apparatus on the subregion represented by the i-th polygonal plane, wherein the traversable polygonal plane sequence comprises N polygonal planes, N is a positive integer greater than or equal to 2, i is a positive integer less than or equal to N−1, the 1st polygonal plane is the polygonal plane corresponding to the subregion where the starting point is located, a path starting point of a 1st path segment is the starting point, and a path starting point of an (i+1)-th path segment is a path end point of the i-th path segment;

searching, according to obstacle distribution on a subregion represented by an N-th polygonal plane in the traversable polygonal plane sequence, for a path with a target of minimizing a movement path for the autonomous mobile mowing apparatus moving to the end point, to determine an N-th path segment of the autonomous mobile mowing apparatus on the subregion represented by the N-th polygonal plane, wherein the N-th polygonal plane is the polygonal plane corresponding to the subregion where the end point is located; and sequentially combining the 1st path segment to the N-th path segment to obtain the first transfer path of the autonomous mobile mowing apparatus transferring from the starting point to the end point.

2. The method according to claim 1, wherein the three-dimensional information comprises a maximum pitch angle and a maximum roll angle, and the parameters of the autonomous mobile mowing apparatus comprise a pitch angle threshold and a roll angle threshold; and the determining, according to the three-dimensional information of each of the polygonal planes in the first polygonal grid map and the parameters of the autonomous mobile mowing apparatus, the avoidance subregion non-traversable for the autonomous mobile mowing apparatus in the target work region comprises:

determining, for each of the polygonal planes in the first polygonal grid map, a subregion represented by the polygonal plane as the avoidance subregion non-traversable for the autonomous mobile mowing apparatus when the polygonal plane satisfies at least one of two conditions that the maximum pitch angle corresponding to the polygonal plane is greater than the pitch angle threshold, and the maximum roll angle corresponding to the polygonal plane is greater than the roll angle threshold.

3. The method according to claim 1, wherein the determining the at least one traversable polygonal plane sequence according to the polygonal planes respectively corresponding to the subregion where the starting point is located and the subregion where the end point is located and the adjacency relationship between the polygonal planes in the second polygonal grid map comprises:

establishing an undirected graph corresponding to the second polygonal grid map according to the adjacency relationship between the polygonal planes in the second polygonal grid map; and determining the at least one traversable polygonal plane sequence based on the polygonal plane where the starting point is located, the polygonal plane where the end point is located and the undirected graph.

4. The method according to claim 1, wherein the controlling the autonomous mobile mowing apparatus to move in the target work region according to the second polygonal grid map further comprises:

determining, for each polygonal plane in the second polygonal grid map, whether there is an obstacle on a subregion represented by the polygonal plane; and determining, when there is no obstacle on the subregion represented by the polygonal plane, a minimum bounding rectangle of the polygonal plane, determining a coverage path of the autonomous mobile mowing apparatus within the subregion represented by the polygonal plane with a long side direction of the minimum bounding rectangle as a mowing path direction of the autonomous mobile mowing apparatus, and controlling the autonomous mobile mowing apparatus to move in the subregion represented by the polygonal plane according to the coverage path.

5. The method according to claim 4, wherein the method further comprises:

dividing, when there is an obstacle on the subregion represented by the polygonal plane, an obstacle-free distribution region included in the polygonal plane into at least two convex polygonal blocks, wherein there is no obstacle on a part of the target work region represented by the obstacle-free distribution region; and determining, for each of the convex polygonal blocks, a minimum bounding rectangle of the convex polygonal block, determining a coverage path of the autonomous mobile mowing apparatus within a part of the target work region represented by the convex polygonal block with a long side direction of the minimum bounding rectangle as a mowing path direction of the autonomous mobile mowing apparatus, and controlling the autonomous mobile mowing apparatus to move in the part of the target work region represented by the convex polygonal block according to the coverage path.

6. The method according to claim 5, wherein the method further comprises:

determining an order of coverage for parts of the target working region represented by the at least two convex polygonal blocks by the autonomous mobile mowing apparatus;

determining, for a starting convex polygonal block and an end convex polygonal block that are adjacent in the order of coverage, a convex polygonal block sequence corresponding to the starting convex polygonal block and the end convex polygonal block according to an adjacency relationship between the at least two convex polygonal blocks;

determining a starting point position of the autonomous mobile mowing apparatus on a part of the target work region represented by the starting convex polygonal block, and determining an end point position of the autonomous mobile mowing apparatus on a part of the target work region represented by the end convex polygonal block;

searching, according to obstacle distribution on the subregion represented by the polygonal plane, for a path with a target of minimizing a movement path for the autonomous mobile mowing apparatus moving to a part of the target work region represented by a (j+1)-th convex polygonal block, to determine a j-th path segment of the autonomous mobile mowing apparatus on a part of the target work region represented by a j-th convex polygonal block, wherein the convex polygonal block sequence comprises M convex polygonal blocks, M is a positive integer, j is a positive integer less than or equal to M−1, a 1st convex polygonal block is the starting convex polygonal block, a path starting point of a 1st path segment is a position of the starting point, and a path starting point of a (j+1)-th path segment is a path end point of the j-th path segment;

searching, according to the obstacle distribution on the subregion represented by the polygonal plane, for a path with a target of minimizing a movement path for the autonomous mobile mowing apparatus moving to the end point position, to determine an M-th path segment of the autonomous mobile mowing apparatus on a part of the target work region represented by an M-th convex polygonal block, wherein the M-th convex polygonal block is a convex polygonal block corresponding to a part of the target work region where the end point position is located; and sequentially combining the 1st path segment to the M-th path segment to obtain a transfer path of the autonomous mobile mowing apparatus transferring from the starting convex polygonal block to the end convex polygonal block.

7. The method according to claim 1, wherein the controlling the autonomous mobile mowing apparatus to move in the target work region according to the second polygonal grid map comprises:
   determining, for each of the polygonal planes in the second polygonal grid map, an upper speed limit value of the autonomous mobile mowing apparatus moving on a subregion represented by the polygonal plane according to an angle of the polygonal plane with respect to a horizontal plane, and controlling the autonomous mobile mowing apparatus to move in the subregion represented by the polygonal plane according to the upper speed limit value such that a moving speed of the autonomous mobile mowing apparatus is less than the upper speed limit value.

8. An electronic device, comprising: a processor, a communication interface, a memory, and a communication bus, wherein the processor, the memory, and the communication interface communicate with each other through the communication bus; and
   the memory is configured to store at least one executable instruction, wherein the executable instruction causes the processor to perform operations of:
   acquiring a first polygonal grid map corresponding to a target work region, wherein the first polygonal grid map comprises a three-dimensional continuous surface formed by splicing a plurality of polygonal planes, and different polygonal planes represent different subregions in the target work region;
   determining, according to three-dimensional information of each of the polygonal planes in the first polygonal grid map and parameters of an autonomous mobile mowing apparatus, an avoidance subregion non-traversable for the autonomous mobile mowing apparatus in the target work region;
   deleting a polygonal plane corresponding to the avoidance subregion from the first polygonal grid map to obtain a second polygonal grid map; and
   controlling the autonomous mobile mowing apparatus to move in the target work region according to the second polygonal grid map,
   wherein the controlling the autonomous mobile mowing apparatus to move in the target work region according to the second polygonal grid map comprises:
      determining a starting point and an end point of position transfer of the autonomous mobile mowing apparatus;
      determining polygonal planes respectively corresponding to a subregion where the starting point is located and a subregion where the end point is located;
      determining at least one traversable polygonal plane sequence according to the polygonal planes respectively corresponding to the subregion where the starting point is located and the subregion where the end point is located and an adjacency relationship between polygonal planes in the second polygonal grid map, wherein the traversable polygonal plane sequence comprises at least two successively adjacent polygonal planes, a first polygonal plane in the traversable polygonal plane sequence is the polygonal plane corresponding to the subregion where the starting point is located, and a last polygonal plane in the traversable polygonal plane sequence is the polygonal plane corresponding to the subregion where the end point is located;
      determining, for each of the traversable polygonal plane sequence, a first transfer path of the autonomous mobile mowing apparatus transferring from the starting point to the end point according to the traversable polygonal plane sequence;
      filtering the first transfer path to obtain a second transfer path with a shortest path length; and
      controlling the autonomous mobile mowing apparatus to move from the starting point to the end point according to the second transfer path; and
      wherein the determining, for each of the traversable polygonal plane sequence, the first transfer path of the autonomous mobile mowing apparatus transferring from the starting point to the end point according to the traversable polygonal plane sequence comprises:
         searching, for each of the traversable polygonal plane sequence, according to obstacle distribution on a subregion represented by an i-th polygonal plane in the traversable polygonal plane sequence, for a path with a target of minimizing a movement path for the autonomous mobile mowing apparatus moving to a subregion represented by an (i+1)th polygonal plane, to determine an i-th path segment of the autonomous mobile mowing apparatus on the subregion represented by the i-th polygonal plane, wherein the traversable polygonal plane sequence comprises N polygonal planes, N is a positive integer greater than or equal to 2, i is a positive integer less than or equal to N−1, the 1st polygonal plane is the polygonal plane corresponding to the subregion where the starting point is located, a path starting point of a 1st path segment is the starting point, and a path starting point of an (i+1)-th path segment is a path end point of the i-th path segment;
         searching, according to obstacle distribution on a subregion represented by an N-th polygonal plane in the traversable polygonal plane sequence, for a path with a target of minimizing a movement path for the autonomous mobile mowing apparatus moving to the end point, to determine an N-th path segment of the autonomous mobile mowing apparatus on the subregion represented by the N-th polygonal plane, wherein the N-th polygonal plane is the polygonal plane corresponding to the subregion where the end point is located; and
         sequentially combining the 1st path segment to the N-th path segment to obtain the first transfer path of the autonomous mobile mowing apparatus transferring from the starting point to the end point.

9. The electronic device according to claim 8, wherein the three-dimensional information comprises a maximum pitch angle and a maximum roll angle, and the parameters of the autonomous mobile mowing apparatus comprise a pitch angle threshold and a roll angle threshold; and
   the determining, according to the three-dimensional information of each of the polygonal planes in the first polygonal grid map and the parameters of the autonomous mobile mowing apparatus, the avoidance subregion non-traversable for the autonomous mobile mowing apparatus in the target work region comprises:
determining, for each of the polygonal planes in the first polygonal grid map, a subregion represented by the polygonal plane as the avoidance subregion non-traversable for the autonomous mobile mowing apparatus when the polygonal plane satisfies at least one of two conditions that the maximum pitch angle corresponding to the polygonal plane is greater than the pitch angle threshold, and the maximum roll angle corresponding to the polygonal plane is greater than the roll angle threshold.

10. The electronic device according to claim 8, wherein the determining the at least one traversable polygonal plane sequence according to the polygonal planes respectively corresponding to the subregion where the starting point is located and the subregion where the end point is located and the adjacency relationship between the polygonal planes in the second polygonal grid map comprises:
establishing an undirected graph corresponding to the second polygonal grid map according to the adjacency relationship between the polygonal planes in the second polygonal grid map; and
determining the at least one traversable polygonal plane sequence based on the polygonal plane where the starting point is located, the polygonal plane where the end point is located and the undirected graph.

11. The electronic device according to claim 8, wherein the controlling the autonomous mobile mowing apparatus to move in the target work region according to the second polygonal grid map further comprises:
determining, for each polygonal plane in the second polygonal grid map, whether there is an obstacle on a subregion represented by the polygonal plane; and
determining, when there is no obstacle on the subregion represented by the polygonal plane, a minimum bounding rectangle of the polygonal plane, determining a coverage path of the autonomous mobile mowing apparatus within the subregion represented by the polygonal plane with a long side direction of the minimum bounding rectangle as a mowing path direction of the autonomous mobile mowing apparatus, and controlling the autonomous mobile mowing apparatus to move in the subregion represented by the polygonal plane according to the coverage path.

12. The electronic device according to claim 11, wherein the executable instruction causes the processor to further perform operations of:
dividing, when there is an obstacle on the subregion represented by the polygonal plane, an obstacle-free distribution region included in the polygonal plane into at least two convex polygonal blocks, wherein there is no obstacle on a part of the target work region represented by the obstacle-free distribution region; and
determining, for each of the convex polygonal blocks, a minimum bounding rectangle of the convex polygonal block, determining a coverage path of the autonomous mobile mowing apparatus within the part of the target work region represented by the convex polygonal block with a long side direction of the minimum bounding rectangle as the mowing path direction of the autonomous mobile mowing apparatus, and controlling the autonomous mobile mowing apparatus to move in the part of the target work region represented by the convex polygonal block according to the coverage path.

13. The electronic device according to claim 12, wherein the executable instruction causes the processor to further perform operations of:
determining an order of coverage for parts of the target working region represented by the at least two convex polygonal blocks by the autonomous mobile mowing apparatus;
determining, for a starting convex polygonal block and an end convex polygonal block that are adjacent in the order of coverage, a convex polygonal block sequence corresponding to the starting convex polygonal block and the end convex polygonal block according to an adjacency relationship between the at least two convex polygonal blocks;
determining a starting point position of the autonomous mobile mowing apparatus on a part of the target work region represented by the starting convex polygonal block, and determining an end point position of the autonomous mobile mowing apparatus on a part of the target work region represented by the end convex polygonal block;
searching, according to obstacle distribution on the subregion represented by the polygonal plane, for a path with a target of minimizing a movement path for the autonomous mobile mowing apparatus moving to a part of the target work region represented by a (j+1)-th convex polygonal block, to determine a j-th path segment of the autonomous mobile mowing apparatus on a part of the target work region represented by a j-th convex polygonal block, wherein the convex polygonal block sequence comprises M convex polygonal blocks, M is a positive integer, j is a positive integer less than or equal to M−1, a 1st convex polygonal block is the starting convex polygonal block, a path starting point of a 1st path segment is a position of the starting point, and a path starting point of a (j+1)-th path segment is a path end point of the j-th path segment;
searching, according to the obstacle distribution on the subregion represented by the polygonal plane, for a path with a target of minimizing a movement path for the autonomous mobile mowing apparatus moving to the end point position, to determine an M-th path segment of the autonomous mobile mowing apparatus on a part of the target work region represented by an M-th convex polygonal block, wherein the M-th convex polygonal block is a convex polygonal block corresponding to a part of the target work region where the end point position is located; and
sequentially combining the 1st path segment to the M-th path segment to obtain a transfer path of the autonomous mobile mowing apparatus transferring from the starting convex polygonal block to the end convex polygonal block.

14. The electronic device according to claim 8, wherein the executable instruction causes the processor to further perform operations of:
determining, for each of the polygonal planes in the second polygonal grid map, an upper speed limit value of the autonomous mobile mowing apparatus moving on a subregion represented by the polygonal plane according to an angle of the polygonal plane with respect to a horizontal plane, and controlling the autonomous mobile mowing apparatus to move in the subregion represented by the polygonal plane according to the upper speed limit value such that a moving speed of the autonomous mobile mowing apparatus is less than the upper speed limit value.

15. A non-transitory computer storage medium, storing a computer program thereon, wherein the program, when executed by a processor, implements operations of:
- acquiring a first polygonal grid map corresponding to a target work region, wherein the first polygonal grid map comprises a three-dimensional continuous surface formed by splicing a plurality of polygonal planes, and different polygonal planes represent different subregions in the target work region;
- determining, according to three-dimensional information of each of the polygonal planes in the first polygonal grid map and parameters of an autonomous mobile mowing apparatus, an avoidance subregion non-traversable for the autonomous mobile mowing apparatus in the target work region;
- deleting a polygonal plane corresponding to the avoidance subregion from the first polygonal grid map to obtain a second polygonal grid map; and
- controlling the autonomous mobile mowing apparatus to move in the target work region according to the second polygonal grid map,
- wherein the controlling the autonomous mobile mowing apparatus to move in the target work region according to the second polygonal grid map comprises:
  - determining a starting point and an end point of position transfer of the autonomous mobile mowing apparatus;
  - determining polygonal planes respectively corresponding to a subregion where the starting point is located and a subregion where the end point is located;
  - determining at least one traversable polygonal plane sequence according to the polygonal planes respectively corresponding to the subregion where the starting point is located and the subregion where the end point is located and an adjacency relationship between polygonal planes in the second polygonal grid map, wherein the traversable polygonal plane sequence comprises at least two successively adjacent polygonal planes, a first polygonal plane in the traversable polygonal plane sequence is the polygonal plane corresponding to the subregion where the starting point is located, and a last polygonal plane in the traversable polygonal plane sequence is the polygonal plane corresponding to the subregion where the end point is located;
  - determining, for each of the traversable polygonal plane sequence, a first transfer path of the autonomous mobile mowing apparatus transferring from the starting point to the end point according to the traversable polygonal plane sequence;
  - filtering the first transfer path to obtain a second transfer path with a shortest path length; and
  - controlling the autonomous mobile mowing apparatus to move from the starting point to the end point according to the second transfer path; and
  - wherein the determining, for each of the traversable polygonal plane sequence, the first transfer path of the autonomous mobile mowing apparatus transferring from the starting point to the end point according to the traversable polygonal plane sequence comprises:
    - searching, for each of the traversable polygonal plane sequence, according to obstacle distribution on a subregion represented by an i-th polygonal plane in the traversable polygonal plane sequence, for a path with a target of minimizing a movement path for the autonomous mobile mowing apparatus moving to a subregion represented by an (i+1)th polygonal plane, to determine an i-th path segment of the autonomous mobile mowing apparatus on the subregion represented by the i-th polygonal plane, wherein the traversable polygonal plane sequence comprises N polygonal planes, N is a positive integer greater than or equal to 2, i is a positive integer less than or equal to N−1, the 1st polygonal plane is the polygonal plane corresponding to the subregion where the starting point is located, a path starting point of a 1st path segment is the starting point, and a path starting point of an (i+1)-th path segment is a path end point of the i-th path segment;
    - searching, according to obstacle distribution on a subregion represented by an N-th polygonal plane in the traversable polygonal plane sequence, for a path with a target of minimizing a movement path for the autonomous mobile mowing apparatus moving to the end point, to determine an N-th path segment of the autonomous mobile mowing apparatus on the subregion represented by the N-th polygonal plane, wherein the N-th polygonal plane is the polygonal plane corresponding to the subregion where the end point is located; and
    - sequentially combining the 1st path segment to the N-th path segment to obtain the first transfer path of the autonomous mobile mowing apparatus transferring from the starting point to the end point.

16. The non-transitory computer storage medium according to claim 15, wherein the three-dimensional information comprises a maximum pitch angle and a maximum roll angle, and the parameters of the autonomous mobile mowing apparatus comprise a pitch angle threshold and a roll angle threshold; and
- the determining, according to the three-dimensional information of each of the polygonal planes in the first polygonal grid map and the parameters of the autonomous mobile mowing apparatus, the avoidance subregion non-traversable for the autonomous mobile mowing apparatus in the target work region comprises:
- determining, for each of the polygonal planes in the first polygonal grid map, a subregion represented by the polygonal plane as the avoidance subregion non-traversable for the autonomous mobile mowing apparatus when the polygonal plane satisfies at least one of two conditions that the maximum pitch angle corresponding to the polygonal plane is greater than the pitch angle threshold, and the maximum roll angle corresponding to the polygonal plane is greater than the roll angle threshold.

17. The non-transitory computer storage medium according to claim 15, wherein the determining the at least one traversable polygonal plane sequence according to the polygonal planes respectively corresponding to the subregion where the starting point is located and the subregion where the end point is located and the adjacency relationship between the polygonal planes in the second polygonal grid map comprises:
- establishing an undirected graph corresponding to the second polygonal grid map according to the adjacency relationship between the polygonal planes in the second polygonal grid map; and determining the at least one traversable polygonal plane sequence based on the polygonal plane where the starting point is located, the polygonal plane where the end point is located and the undirected graph.

18. The non-transitory computer storage medium according to claim 15, wherein the controlling the autonomous mobile mowing apparatus to move in the target work region according to the second polygonal grid map further comprises:
   determining, for each polygonal plane in the second polygonal grid map, whether there is an obstacle on a subregion represented by the polygonal plane; and
   determining, when there is no obstacle on the subregion represented by the polygonal plane, a minimum bounding rectangle of the polygonal plane, determining a coverage path of the autonomous mobile mowing apparatus within the subregion represented by the polygonal plane with a long side direction of the minimum bounding rectangle as a mowing path direction of the autonomous mobile mowing apparatus, and controlling the autonomous mobile mowing apparatus to move in the subregion represented by the polygonal plane according to the coverage path.

19. The non-transitory computer storage medium according to claim 18, wherein the program, when executed by a processor, further implements operations of:
   dividing, when there is an obstacle on the subregion represented by the polygonal plane, an obstacle-free distribution region included in the polygonal plane into at least two convex polygonal blocks, wherein there is no obstacle on a part of the target work region represented by the obstacle-free distribution region; and
   determining, for each of the convex polygonal blocks, a minimum bounding rectangle of the convex polygonal block, determining a coverage path of the autonomous mobile mowing apparatus within the part of the target work region represented by the convex polygonal block with a long side direction of the minimum bounding rectangle as the mowing path direction of the autonomous mobile mowing apparatus, and controlling the autonomous mobile mowing apparatus to move in the part of the target work region represented by the convex polygonal block according to the coverage path.

20. A non-transitory computer program product, comprising a computer instruction, the computer instruction instructing a computing device to perform operations of the movement control method according to claim 1.

\* \* \* \* \*